United States Patent
Yasui

(10) Patent No.: US 9,732,684 B2
(45) Date of Patent: Aug. 15, 2017

(54) CONTROL APPARATUS

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 14/668,145

(22) Filed: Mar. 25, 2015

(65) Prior Publication Data

US 2015/0275731 A1 Oct. 1, 2015

(30) Foreign Application Priority Data

Mar. 26, 2014 (JP) .................. 2014-064411

(51) Int. Cl.
*F01N 3/20* (2006.01)
*F02D 41/00* (2006.01)
(Continued)

(52) U.S. Cl.
CPC ......... *F02D 41/0007* (2013.01); *F01N 3/208* (2013.01); *F02B 37/24* (2013.01); *F02D 41/0052* (2013.01); *F02D 41/1401* (2013.01); *F01N 2610/02* (2013.01); *F01N 2900/0408* (2013.01); *F01N 2900/1818* (2013.01); *F02D 41/0077* (2013.01); *F02D 41/10* (2013.01); (Continued)

(58) Field of Classification Search
CPC ........... F02D 41/0052; F02D 2041/141; F02D 2041/1422; F02D 2041/1431

USPC ......................................... 123/564
See application file for complete search history.

(56) References Cited

U.S. PATENT DOCUMENTS 6,327,850 B1 * 12/2001 Yasui .................. F02D 41/0082
123/692
6,370,473 B1 * 4/2002 Yasui .................. F02D 41/0082
123/692

(Continued)

FOREIGN PATENT DOCUMENTS

JP 2005-171893 A 6/2005
JP 4282572 B2 6/2009

*Primary Examiner* — Sizo Vilakazi
*Assistant Examiner* — Kevin R Steckbauer
(74) *Attorney, Agent, or Firm* — Squire Patton Boggs (US) LLP

(57) ABSTRACT

A control apparatus controlling a controlled variable of a controlled object having a response lag characteristic using a combination of feedforward control method, response-specifying control method, and disturbance compensation method. An ECU of the apparatus calculates driver demand boost pressure for feedforward-controlling actual boost pressure as controlled variable, and calculates FB target pressure as value on which response lag characteristic of the actual value to the driver demand value is reflected. The ECU calculates error as difference between the actual and target values, and feedback correction term as sum of equivalent control input including disturbance estimated value and the error as variables and reaching law input, using equation defining relationship between the error, feedback correction term value, and disturbance estimated value, and response-specifying control algorithm, and then adds the correction term value to the driver demand value to thereby calculate demanded boost pressure as control input.

4 Claims, 12 Drawing Sheets

(51) Int. Cl.
*F02D 41/14* (2006.01)
*F02B 37/24* (2006.01)
*F02D 41/10* (2006.01)

(52) U.S. Cl.
CPC ........... *F02D 2041/1409* (2013.01); *F02D 2041/1422* (2013.01); *F02D 2041/1431* (2013.01); *Y02T 10/144* (2013.01); *Y02T 10/24* (2013.01); *Y02T 10/47* (2013.01)

(56) References Cited

U.S. PATENT DOCUMENTS

| | | | | |
|---|---|---|---|---|
| 6,510,692 B2* | 1/2003 | Shirakawa | ............... | F02B 37/22 60/602 |
| 6,625,985 B2* | 9/2003 | Shirakawa | ............... | F02B 37/22 60/602 |
| 6,672,060 B1* | 1/2004 | Buckland | ............... | F02D 23/005 123/564 |
| 6,886,334 B2* | 5/2005 | Shirakawa | ............ | F02D 35/025 123/568.21 |
| 7,379,809 B2* | 5/2008 | Yasui | ....................... | F02D 21/08 123/345 |
| 7,568,454 B2* | 8/2009 | Yasui | ....................... | F01L 1/34 123/346 |
| 8,005,605 B2* | 8/2011 | Yasui | ................. | F02D 41/0235 701/109 |
| 8,209,979 B2* | 7/2012 | Wang | .................... | F02B 37/004 60/600 |
| 8,560,206 B2* | 10/2013 | Ejiri | .................... | F02D 41/0007 60/605.2 |
| 8,567,192 B2* | 10/2013 | Chi | ........................ | F02B 37/18 123/562 |
| 8,615,997 B2* | 12/2013 | Ejiri | .................... | F02D 41/0007 123/568.11 |
| 8,820,297 B2* | 9/2014 | Iwatani | ............... | F02D 41/0007 123/348 |
| 8,967,118 B2* | 3/2015 | Whitney | ............. | F02D 13/0219 123/406.23 |
| 2002/0170291 A1* | 11/2002 | Shirakawa | ............... | F02B 37/22 60/602 |
| 2002/0189254 A1* | 12/2002 | Shirakawa | ............... | F02B 37/22 60/602 |
| 2003/0140629 A1* | 7/2003 | Shirakawa | ............ | F02D 35/025 60/600 |
| 2007/0131186 A1* | 6/2007 | Yasui | ........................ | F01L 1/34 123/90.16 |
| 2007/0198163 A1* | 8/2007 | Yasui | ..................... | F02D 21/08 701/103 |
| 2010/0242470 A1* | 9/2010 | Wang | .................... | F02B 37/004 60/602 |
| 2010/0256894 A1* | 10/2010 | Yasui | ................. | F02D 41/0235 701/108 |
| 2011/0077837 A1* | 3/2011 | Ejiri | .................... | F02D 41/0007 701/102 |
| 2012/0023932 A1* | 2/2012 | Ge | ...................... | F02D 41/0007 60/602 |
| 2012/0180759 A1* | 7/2012 | Whitney | ............. | F02D 13/0219 123/406.23 |
| 2012/0285420 A1* | 11/2012 | Iwatani | ............... | F02D 41/0007 123/348 |
| 2013/0074492 A1* | 3/2013 | Chi | ........................ | F02B 37/18 60/602 |
| 2014/0330492 A1* | 11/2014 | Hasegawa | ........... | F02D 41/0007 701/54 |
| 2016/0265468 A1* | 9/2016 | Takayanagi | ........... | F02B 37/013 |
| 2016/0305353 A1* | 10/2016 | Sase | ..................... | F02B 37/013 |

* cited by examiner

F I G. 1 2
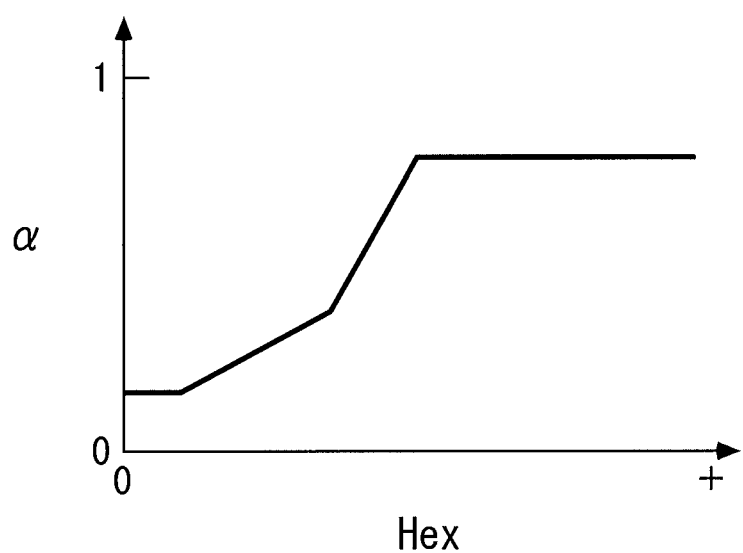

CONTROL APPARATUS

BACKGROUND OF THE INVENTION

Field of the Invention

The present invention relates to a control apparatus for controlling a controlled object having a response lag characteristic.

Description of the Related Art

Conventionally, as a control apparatus, there has been known one disclosed in Japanese Laid-Open Patent Publication (Kokai) No. 2005-171893. This control apparatus controls a variable nozzle type turbocharger as a controlled object. This control apparatus calculates a target boost pressure epimtrg according to operating conditions of the engine, and feedback-controls an actual boost pressure epim such that the actual boost pressure epim becomes equal to the target boost pressure epimtrg, using a feedback control algorithm.

With this feedback control algorithm, a boost pressure difference epimdlt, which is a difference between the actual boost pressure epim and the target boost pressure epimtrg, is calculated, and a feedback control term epvnpmfb is calculated based on the boost pressure difference epimdlt, as a total sum of a proportional term epvnpmp, an integral term epvnpmi, and a derivative term epvnpmd, by a PID control method. Further, a sum epbnbse+epvnpmfb of the feedback control term epvnpmfb and a basic value epbnbse of boost pressure is compared with a predetermined minimum limiting value epvnpmin, and then the larger one of them is compared with a predetermined maximum limiting value epvnpmax, whereby the larger one of them is set as a final opening epvnfin. Then, the actual boost pressure epim is feedback-controlled such that the actual boost pressure epim becomes equal to the target boost pressure epimtrg by controlling supply current to a DC motor according to the final opening epvnfin.

On the other hand, in calculation of the integral term epvnpmi, when predetermined update inhibiting conditions are satisfied in a transient operating condition of the engine, an update of the integral term epvnpmi is inhibited, and the integral term epvnpmi is maintained at the immediately preceding value thereof. This is for suppressing an overshoot of the actual boost pressure epim, because, in the case of the variable nozzle type turbocharger, the actual boost pressure epim has a characteristic of being liable to overshoot with respect to the target boost pressure epimtrg due to the response lag, and this problem becomes more conspicuous in a transient operating condition of the engine.

Further, the present applicant has already proposed a control apparatus disclosed in the Publication of Japanese Patent No. 4282572. This control apparatus controls a variable cam phase mechanism as a controlled object, and the variable cam phase mechanism changes a cam phase CAIN as a phase of an intake cam with respect to a crankshaft of the engine. In general, in a variable cam phase mechanism, the cam phase CAIN is liable to delay in following up a target value or overshoot the target value due to a response lag of the variable cam phase mechanism.

In order to compensate for the response lag characteristic of the variable cam phase mechanism, in the control apparatus disclosed in Japanese Laid-Open Patent Publication (Kokai) No. 2005-171893, a control input Ucain to the variable cam phase mechanism is calculated using a control algorithm to which are applied a response-specifying control algorithm and an adaptive disturbance observer and a discrete-time system model defining the relationship between the control input Ucain to the variable cam phase mechanism, the cam phase CAIN, and a disturbance estimated value c1. More specifically, the control input Ucain is calculated as the sum of an equivalent control input Ueq and a reaching law input Urch, and the equivalent control input Ueq is calculated such that the cam phase CAIN, the target value of the cam phase CAIN, and the disturbance estimated value c1 are included therein as variables. In short, the equivalent control input Ueq is calculated by a deadbeat control method as a feedforward control term (feedforward control input) for causing the controlled variable to follow up the target value while compensating for the response lag characteristic of the variable cam phase mechanism.

In the case of controlling the variable cam phase mechanism using the control input Ucain calculated as above, the effect of disturbance compensation by the disturbance estimated value c1 makes it possible to suppress occurrence of follow-up lag and overshoot due to the above-mentioned response lag to thereby ensure high control accuracy.

According to the control apparatus disclosed in Japanese Laid-Open Patent Publication (Kokai) No. 2005-171893, when the predetermined update inhibiting conditions are satisfied, the update of the integral term epvnpmi is inhibited, however, if it is determined that the predetermined update inhibiting conditions are not satisfied in a state where the actual boost pressure epim is below the target boost pressure epimtrg, the update of the integral term is started from the time of the determination. In this case, the integral term is increased after start of the update of the integral term, which may result in overshoot of the actual boost pressure epim with respect to the target boost pressure epimtrg.

If the update inhibition period of the integral term is set longer so as to avoid this inconvenience, after starting the update of the integral term, the actual boost pressure epim may not reach the target boost pressure epimtrg, or to the contrary, there may occur an excessive overshoot due to causing the actual boost pressure epim to be rapidly made closer to the target boost pressure epimtrg.

To solve the above problem, it is envisaged to apply the control method disclosed in the Publication of Japanese Patent No. 4282572 to the control apparatus disclosed in Japanese Laid-Open Patent Publication (Kokai) No. 2005-171893 and calculate the feedback control term epvnpmfb appearing in Japanese Laid-Open Patent Publication (Kokai) No. 2005-171893, using the method of calculating the control input Ucain, which is disclosed in the Publication of Japanese Patent No. 4282572. More specifically, it is envisaged to calculate the feedback control term epvnpmfb as the sum of the equivalent control input Ueq and the reaching law input Urch and then add the feedback control term epvnpmfb to the basic value epbnbse of boost pressure to thereby calculate the final opening epvnfin.

However, in the case of such configuration, since the equivalent control input Ueq is calculated as a feedforward control term, as described above, mutual interference between the equivalent control input Ueq and the basic value epbnbse of boost pressure as a feedforward control term can occur, causing degradation of control accuracy. In particular, the equivalent control input Ueq has a deadbeat control characteristic, which can considerably degrade control accuracy. Further, in many cases, an actuator of a controlled object the response lag of which is large is not capable of following up changes in input required for realization of the equivalent control input Ueq, and therefore, when the equivalent control input Ueq is used to control the controlled object, an oscillating behavior or the like can be caused, which degrades control accuracy.

SUMMARY OF THE INVENTION

It is an object of the present invention to provide a control apparatus that controls the controlled variable of a controlled object having a response lag characteristic by a combination of a feedforward control method, a response-specifying control method, and a disturbance compensation method, and is capable of ensuring high control accuracy.

To attain the above object, the present invention provides a control apparatus for controlling a controlled variable of a controlled object having a response lag characteristic, by a control input, comprising controlled variable detecting means for detecting the controlled variable, first input value calculation means for calculating a first input value for controlling the controlled variable in a feedforward manner, using a predetermined feedforward control algorithm, error calculation means for calculating an error using the first input value and the controlled variable, second input value calculation means for calculating an equivalent control input, which includes a disturbance estimated value and the error as variables, and a reaching law input, using a discrete-time system model defining a relationship between the error, a second input value, and the disturbance estimated value, and a predetermined response-specifying control algorithm, and calculating the second input value using a sum of the equivalent control input and the reaching law input, and control input calculation means for calculating the control input using a sum of the first input value and the second input value.

According to this control apparatus, the first input value for feedback-controlling the controlled variable is calculated using a predetermined feedforward control algorithm. In short, the first input value is calculated as a feedforward control term. Further, the error is calculated using the first input value and the controlled variable. The equivalent control input including the disturbance estimated value and the error as variables and the reaching law input are calculated using the discrete-time system model defining the relationship between the error, the second input value, and the disturbance estimated value and the predetermined response-specifying control algorithm. The second input value is calculated using the sum of the equivalent control input and the reaching law input. The control input is calculated using the sum of the first input value and the second input value.

As described above, the equivalent control input is not a feedforward control term including the disturbance estimated value, the controlled variable, and the target value of the controlled variable, as variables, but is calculated as a value including the disturbance estimated value and the error as variables. Therefore, it is possible to calculate the equivalent control input as a value which does not have a deadbeat control characteristic with respect to the change of a target value, but has a high disturbance compensation capability. Therefore, by calculating the control input using the sum of the second input value calculated using the sum of the equivalent control input calculated as above and the reaching law input, and the first input value which is a feedforward control term, it is possible to avoid mutual interference between the equivalent control input and the first input value. In addition, the effects of the disturbance estimated value c make it possible to accurately control the controlled variable of the controlled object having the response lag characteristic, while suppressing occurrence follow-up lag and occurrence of overshoot. As a result, it is possible to ensure high control accuracy when the controlled variable of the controlled object having the response lag characteristic is controlled by the combination of the feedforward control method, the response-specifying control method, and the disturbance compensation method (Note that the term "detect" used in the phrase "detecting a controlled variable" is intended to mean not only directly detecting the controlled variable e.g. by a sensor but also calculating or estimating the controlled variable based on other parameters).

Preferably, the error calculation means includes target value calculation means for calculating a target value as a value on which a response lag characteristic of the controlled variable with respect to the first input value is reflected, and calculates the error as a difference between the target value and the controlled variable.

With the configuration of this preferred embodiment, the target value is calculated as a value on which a response lag of the controlled variable with respect to the first input value is reflected, and the error is calculated as a difference between the target value and the controlled variable. Further, the second input value is calculated as the sum of the equivalent control input including the disturbance estimated value and the error as variables and the reaching law input. Therefore, it is possible to control the error by the second input value such that the error becomes equal to 0. In other words, it is possible to control the controlled variable such that the controlled variable becomes equal to the target value on which the response lag of the controlled variable with respect to the first input value is reflected. As a result, in the case of controlling the controlled variable of the controlled object having the response lag characteristic, it is possible to ensure high response and high control accuracy while suppressing occurrence of follow-up lag and overshoot.

Preferably, the control apparatus further comprises identification means for identifying onboard, in a state where the discrete-time system model is arranged such that a term which is not multiplied by a model parameter of the discrete-time system model is placed on a left side, and a term which is multiplied by the model parameter and the disturbance estimated value are placed on a right side, by setting the left side as a virtual controlled variable and the right side as an estimated value of the virtual controlled variable, the model parameter and the disturbance estimated value such that an error between the virtual controlled variable and the estimated value of the virtual controlled variable is minimized.

With the configuration of this preferred embodiment, in a state where the discrete-time system model is rearranged such that the term which is not multiplied by the model parameter of the discrete-time system model is placed on the left side and the term which is multiplied by the model parameter and the disturbance estimated value are placed on the right, by setting the left side as the virtual controlled variable and the right side as the estimated value of the virtual controlled variable, the model parameter and the disturbance estimated value are identified onboard such that the error between the virtual controlled variable and the estimate of the virtual controlled variable is minimized. The model parameter and the disturbance estimated value can be thus identified onboard, and hence even when a modeling error in the discrete-time system model is increased due to variation between individual products of the controlled object and aging of the same, it is possible to compensate for the modeling error with high accuracy to thereby further improve control accuracy.

Preferably, the controlled variable is a boost pressure which is changed by a supercharger of an internal combustion engine.

In the case of the boost pressure which is changed by the supercharger of the engine, due to the low operating accuracy and low responsiveness of a vane actuator of the supercharger, generally, the response lag with respect to the control input is significantly large. However, according to the present control apparatus, it is possible to ensure high control accuracy in a case where the boost pressure of which the response lag is significantly large is controlled by the combination of the feedforward control method, the response-specifying control method, and the disturbance compensation method, and thereby improve marketability of the control apparatus.

Preferably, the controlled variable is one of an EGR amount and an EGR rate which are changed by an EGR device of an internal combustion engine.

In the case of the EGR amount or the EGR ratio which is changed by the EGR device of the engine, due to the low operating accuracy and low responsiveness of an EGR valve, generally, the response lag with respect to the control input is significantly large. However, according to the present control apparatus, it is possible to ensure high control accuracy in a case where the EGR amount or EGR ratio of which the response lag is significantly large is controlled by the combination of the feedforward control method, the response-specifying control method, and the disturbance compensation method, and thereby improve marketability of the control apparatus.

Preferably, the controlled variable corresponds is one of a concentration and an amount of ammonia having passed through a selective reduction catalyst for purifying NOx in exhaust gases in an internal combustion engine under the presence of a reducing agent which is one of urea and ammonia.

For the selective reduction catalyst for purifying NOx in the exhaust gases in the engine under the presence of a reducing agent which is one of urea and ammonia, there has been known a control method for improving a NOx purification rate of the catalyst by determining the amount of the reducing agent to be supplied such that the concentration or amount of ammonia having passed through the selective reduction catalyst becomes equal to a target value, and thereby controlling the amount of ammonia stored in the selective reduction catalyst such that the storage amount becomes the maximum storage amount (see e.g. the Publication of Japanese Patent No. 5250589). In this case, the response lag of the ammonia concentration or amount as a controlled variable with respect to the control input is significantly large, and hence there is a fear that the NOx purification rate of the selective reduction catalyst lowers and the amount of ammonia that passes through the selective reduction catalyst increases, resulting in an increase in the odor of exhaust gases. According to present control apparatus, however, it is possible to ensure high control accuracy when the ammonia concentration or amount the response lag of which is significantly large is controlled by the combination of the feedforward control method, the response-specifying control method, and the disturbance compensation method. This makes it possible to ensure high NOx purification rate of the selective reduction catalyst to thereby suppress the amount of ammonia that passes through the selective reduction catalyst and reduce the odor of exhaust gases. This results in improvement of the marketability of the control apparatus.

The above and other objects, features, and advantages of the present invention will become more apparent from the following detailed description taken in conjunction with the accompanying drawings.

BRIEF DESCRIPTION OF THE DRAWINGS

FIG. 12 is an example of a map for use in calculating a model parameter $\alpha$ in a parameter scheduler;

DETAILED DESCRIPTION OF PREFERRED EMBODIMENTS

Figure 1:
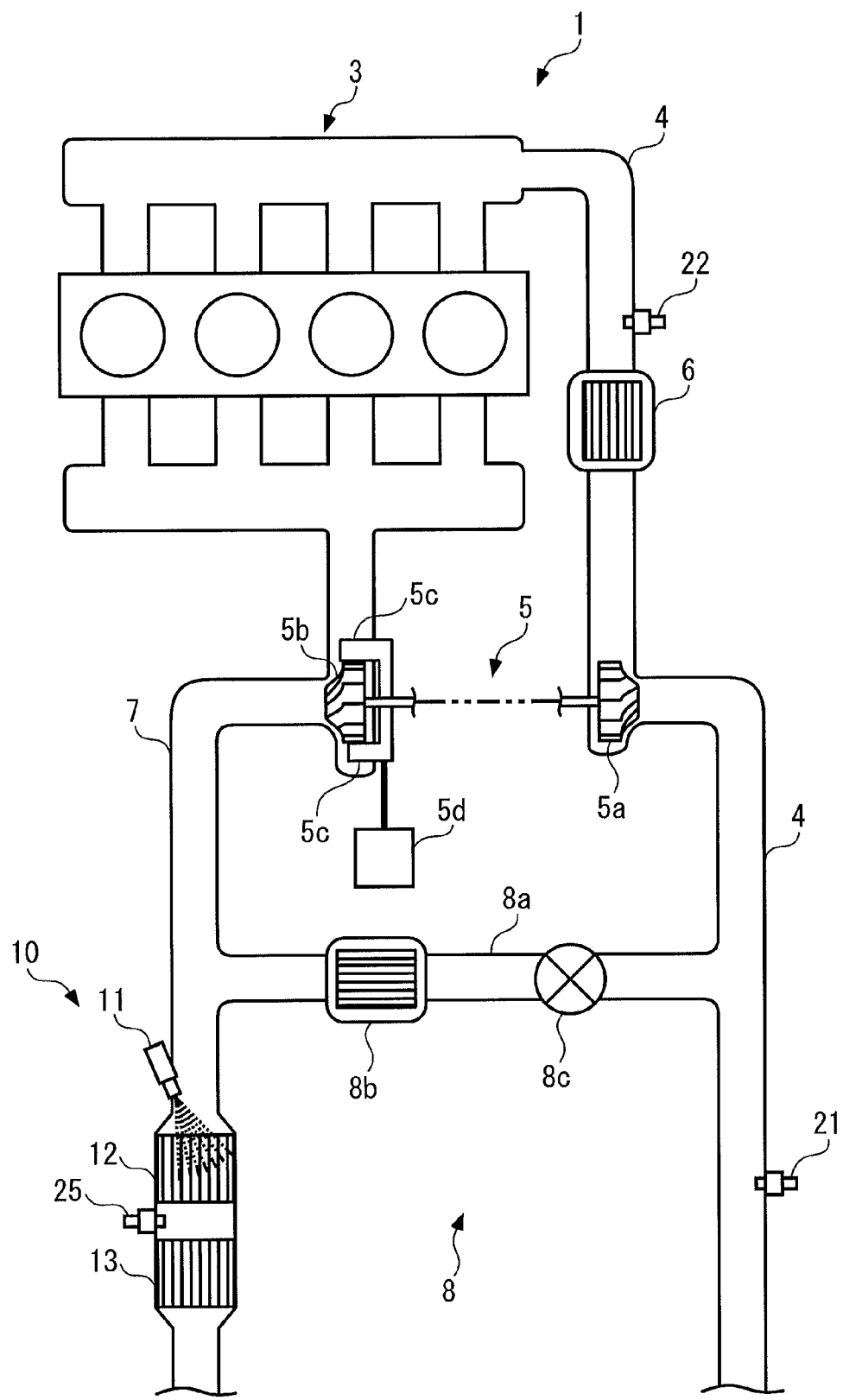
FIG. 1 is a schematic diagram of a control apparatus according to a first embodiment of the present invention, and an internal combustion engine including a supercharger to which is applied the control apparatus.
Figure 2:
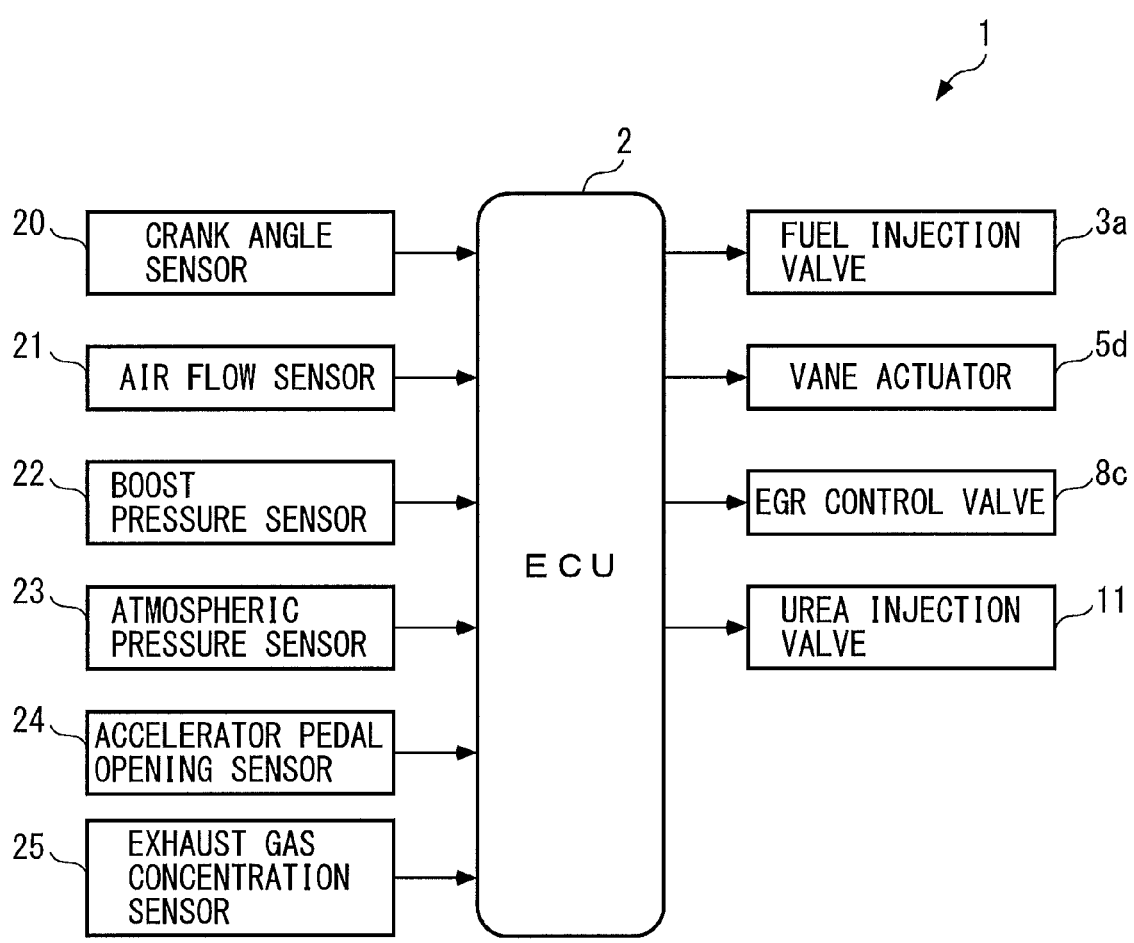
FIG. 2 is an electrical block diagram of the control apparatus.

Hereafter, a control apparatus according to a first embodiment of the present invention will be described with reference to the drawings. As shown in FIG. 1, an internal combustion engine (hereinafter referred to as "the engine") 3 is provided with a supercharger 5 as a controlled object, and the control apparatus 1 of the present embodiment controls boost pressure, that is, performs supercharge control, by controlling the supercharger 5. The control apparatus 1 includes an ECU 2, as shown in FIG. 2, and the ECU 2 performs a supercharge control process as will be described hereinafter.

The engine 3 is of a four-cylinder diesel engine type, and is installed on a vehicle, not shown, as a motive power source. The engine 3 includes fuel injection valves 3a (only one of which is shown in FIG. 2) provided for respective cylinders, and each fuel injection valve 3a is electrically connected to the ECU 2. A fuel injection amount and fuel injection timing of the fuel injection valve 3a are controlled by the ECU 2 by controlling valve-opening timing and valve-closing timing of the fuel injection valve 3a.

Further, the above-described supercharger 5 and an intercooler 6 are disposed in intermediate portions of an intake passage 4 of the engine 3. The supercharger 5 is formed by a variable capacity turbocharger, and includes a compressor blade 5a which is disposed at a location upstream of the intercooler 6 in the intake passage 4, a turbine blade 5b which is provided in an intermediate portion of an exhaust passage 7 and rotates integrally with the compressor blade 5a, a plurality of variable vanes 5c (only two of which are shown), and a vane actuator 5d which actuates the variable vanes 5c.

In the supercharger 5, when the turbine blade 5b is driven for rotation by exhaust gases in the exhaust passage 7, the compressor blade 5a integrally formed therewith rotates at the same time, whereby the air in the intake passage 4 is pressurized, that is, a supercharging operation is performed.

The variable vanes 5c are for varying boost pressure generated by the supercharger 5, and are mechanically connected to the vane actuator 5d connected to the ECU 2. The ECU 2 changes a degree of opening of the variable vanes 5c via the vane actuator 5d to change the rotational speed of the turbine blade 5b, i.e. the rotational speed of the compressor blade 5a, whereby the boost pressure is controlled.

Further, the intercooler 6 is of a water cooling type. When intake air passes through the intercooler 6, the intercooler 6 cools the intake air the temperature of which has been raised by the supercharging operation of the supercharger 5.

On the other hand, the above-described turbine blade 5b and a urea SCR system 10 are provided in the exhaust passage 7 of the engine 3, from upstream in the mentioned order. The urea SCR system 10 is for selectively reducing NOx in exhaust gases, and is provided with a urea injection valve 11, a selective reduction catalyst 12, and a downstream catalyst 13 at respective locations of the exhaust passage 7 of the engine 3 from upstream to downstream in the mentioned order.

The urea injection valve 11 injects urea water from a urea tank, not shown, when opened, into the exhaust passage 7 on the upstream side of the selective reduction catalyst 12, and is electrically connected to the ECU 2. With the urea injection valve 11, the amount of the injected urea water (hereinafter referred to as the "urea injection amount") is controlled by a control input signal from the ECU 2. In this case, part of urea of the urea water injected from the urea injection valve 11 is changed into ammonia by heat of exhaust gases and contact with the selective reduction catalyst 12.

Further, the selective reduction catalyst 12 selectively reduces nitrogen oxide (NOx) in exhaust gases under an atmosphere in which urea exists as a reducing agent. In the selective reduction catalyst 12, ammonia that is changed from urea during injection of urea water is also consumed together with the urea by a NOx reducing action of the selective reduction catalyst 12, and ammonia that is not consumed is stored in the selective reduction catalyst 12.

Further, similarly to the selective reduction catalyst 12, the downstream catalyst 13 is formed by a selective reduction catalyst type that selectively reduces NOx in exhaust gases under an atmosphere in which urea exists as a reducing agent.

Further, the engine 3 is provided with an EGR device 8. The EGR device 8 is for recirculating part of the exhaust gases in the exhaust passage 7 to the intake passage 4 side, and is comprised of an EGR passage 8a connected between the intake passage 4 and the exhaust passage 7, an EGR cooler 8b for cooling recirculated gases flowing through the EGR passage 8a, an EGR control valve 8c for opening and closing the EGR passage 8a, and so forth. One end of the EGR passage 8a opens into a portion of the exhaust passage 7 at a location upstream of the urea injection valve 11, and the other end thereof opens into a portion of the intake passage 4 at a location upstream of the compressor blade 5a.

The EGR control valve 8c is formed by a linear solenoid valve the degree of opening of which is linearly varied between a fully opened state and a fully closed state, and is electrically connected to the ECU 2. The ECU 2 changes the degree of opening of the EGR control valve 8c to thereby control the amount of the recirculated gases (hereinafter referred to as "the EGR amount").

As shown in FIG. 2, a crank angle sensor 20, an air flow sensor 21, a boost pressure sensor 22, an atmospheric pressure sensor 23, an acceleration pedal opening sensor 24, and an exhaust gas concentration sensor 25 are electrically connected to the ECU 2.

The crank angle sensor 20 is comprised of a magnet rotor and an MRE pickup, and delivers a CRK signal, which is a pulse signal, to the ECU 2 along with rotation of a crankshaft, not shown. Each pulse of the CRK signal is generated whenever the crankshaft rotates through a predetermined crank angle (e.g. 2°). The ECU 2 calculates a rotational speed NE of the engine 3 (hereinafter referred to as "the engine speed NE") based on the CRK signal.

The air flow sensor 21 is formed by a hotwire air flow meter, and detects the flow rate of air flowing through the intake passage 4 (hereinafter referred to as "the intake air flow rate") to deliver a signal indicative of the detected intake air flow rate to the ECU 2. The ECU 2 calculates an intake air flow rate Gair based on the detection signal from the air flow sensor 21.

Further, the boost pressure sensor 22 is disposed in the intake passage 4 at a location downstream of the intercooler 6, and detects an actual intake pressure PBact in the intake passage 4, which has been pressurized by the supercharger 5 (hereinafter referred to as "the actual boost pressure PBact"), to deliver a signal indicative of the sensed actual boost pressure PBact to the ECU 2. In the present embodiment, the boost pressure sensor 22 corresponds to controlled variable detecting means and the actual boost pressure PBact corresponds to a controlled variable.

The atmospheric pressure sensor 23 is formed by a semiconductor pressure sensor, and detects an atmospheric pressure PA to deliver a signal indicative of the sensed atmospheric pressure PA to the ECU 2.

Further, the acceleration pedal opening sensor 24 detects a stepped-on amount AP of an accelerator pedal of a vehicle, not shown, (hereinafter referred to as "the accelerator pedal opening AP"), and delivers a signal indicative of the sensed accelerator pedal opening AP to the ECU 2.

Further, the exhaust gas concentration sensor 25 has sensibility to ammonia in exhaust gases, and has a characteristic that a value of a detection signal therefrom becomes larger as the concentration of ammonia in exhaust gases is higher. The ECU 2 calculates an amount NH3act of ammonia that has passed through the selective reduction catalyst 12 (hereinafter referred to as "the NH3 slip amount NH3act"), based on the detection signal from the exhaust gas concentration sensor 25.

The ECU 2 is implemented by a microcomputer comprised of a CPU, a RAM, a ROM, and an I/O interface (none of which are specifically shown). The ECU 2 performs various control processes including the supercharge control process, as described hereinafter, according to the detection signals from the aforementioned sensors 20 to 25 and so forth. In the present embodiment, the ECU 2 corresponds to controlled variable detecting means, first input value calculation means, error calculation means, second input value calculation means, control input calculation means, target value calculation means, and identification means.

Figure 3:
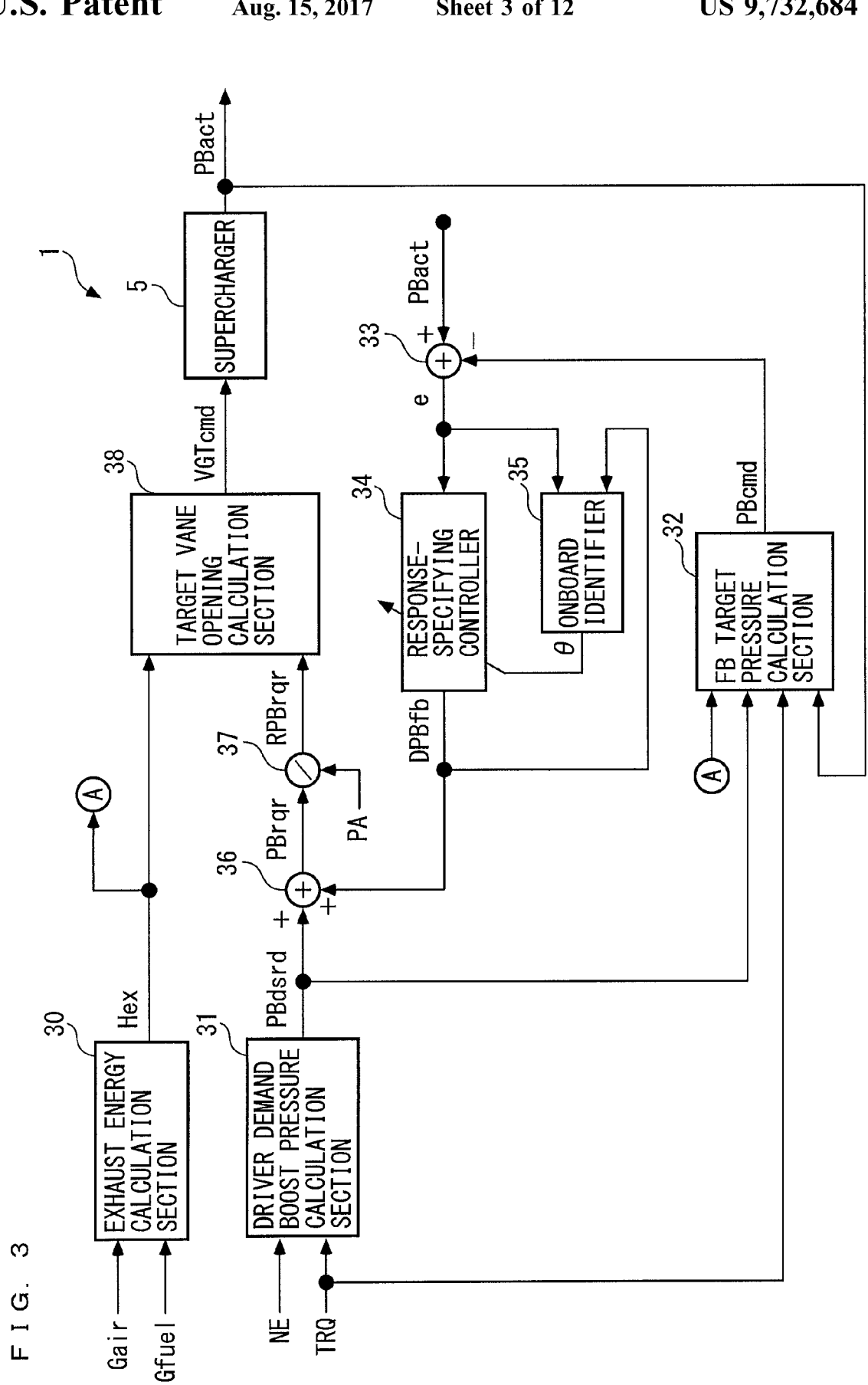
FIG. 3 is a functional block diagram of the control apparatus.

Next, a description will be given of functional components of the control apparatus 1 according to the present embodiment. The control apparatus 1 performs supercharge control, and as shown in FIG. 3, includes an exhaust energy calculation section 30, a driver demand boost pressure calculation section 31, an FB target pressure calculation section 32, a subtractor 33, a response-specifying controller 34, an onboard identifier 35, an adder 36, a divider 37, and a target vane opening calculation section 38. Specifically, these components 30 to 38 are implemented by the ECU 2.

Note that, in the description hereinafter, discrete data with a symbol (k) indicates that it is data calculated or sampled in synchronism with the above-mentioned predetermined period ΔT, and the symbol k (k is a positive integer) indicates a position in the sequence of sampling (or calculating) cycles of respective discrete data. For example, the symbol k indicates that discrete data therewith is a value calculated in the current calculation timing, and a symbol k−1 indicates that discrete data therewith is a value calculated in the immediately preceding calculation timing. This also applies to discrete data referred to hereinafter. Further, in the following description, the symbol (k) provided for the discrete data is omitted as deemed appropriate.

First, an exhaust energy Hex is calculated by the exhaust energy calculation section 30. The exhaust energy Hex is a value that corresponds to energy that is given from exhaust gases to the turbine blade 5b of the supercharger 5, and specifically, is calculated by the following equation (1).

$$Hex(k)=Gair(k)+Ka(k)\cdot Gfuel(k) \qquad (1)$$

Gfuel in the equation (1) represents an amount of fuel injected from the fuel injection valve 3a, and is calculated in a fuel control process, not shown. Further, Ka represents a correction coefficient that is set according to operating conditions of the engine 3.

Further, the driver demand pressure calculation section 31 calculates a driver demand boost pressure PBdsrd. The driver demand boost pressure PBdsrd is boost pressure that is demanded by the driver, and specifically, the driver demand boost pressure PBdsrd is calculated by searching a map shown in FIG. 4 according to a demanded torque TRQ and the engine speed NE. In the present embodiment, the driver demand boost pressure calculation section 31 corresponds to first input value calculation means and the driver demand boost pressure PBdsrd corresponds to and a first input value.

Figure 4:
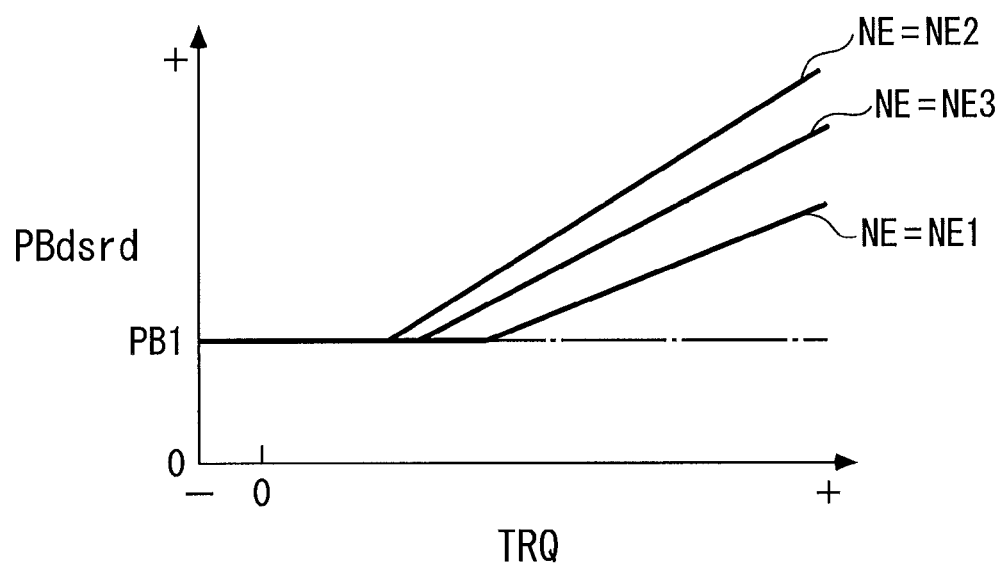
FIG. 4 is an example of a map for use in calculating a driver demand boost pressure PBdsrd.

In FIG. 4, PB1 represents a predetermined boost pressure, and NE1 to NE3 represent predetermined values of the engine speed NE that are set such that NE1<NE2<NE3 holds, respectively. Further, the demanded torque TRQ is an engine torque that is demanded by the driver, and is calculated according to the engine speed NE and the accelerator pedal opening AP in a fuel control process, not shown. In this map, a negative value of the demanded torque TRQ corresponds to an engine torque obtained in a state in which the accelerator pedal is not stepped on, i.e. in an engine braking state during a decelerating fuel cut operation.

Further, the FB target pressure calculation section 32 calculates an FB target pressure PBcmd. The FB target pressure PBcmd is a value that serves as a target when the actual boost pressure PBact is feedback-controlled, and specifically, the FB target pressure PBcmd is calculated by a method expressed by the equations (2) to (9) described hereinafter. In the present embodiment, the FB target pressure calculation section 32 corresponds to the target value calculation means and the FB target pressure PBcmd corresponds to the target value.

First, a provisional value PBcmd_bs_tmp of the reference FB target pressure is calculated by a first-order lag calculation expressed by the following equation (2):

$$PBcmd\_bs\_tmp(k)=(1-KB(k))\cdot PBcmd\_bs(k-1)+KB(k)\cdot PBdsrd(k-db(k)) \qquad (2)$$

Figure 5:
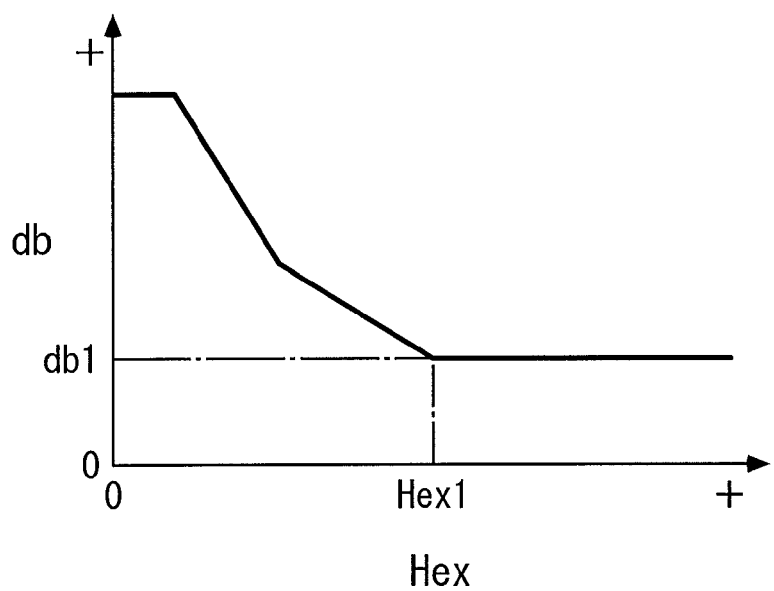
FIG. 5 is an example of a map for use in calculating a dead time db.

In the equation (2), db represents a dead time and KB represents a lag coefficient. The dead time db corresponds to a time period required for the driver demand boost pressure PBdsrd to be reflected on the actual boost pressure PBact, and specifically, it is calculated by searching a map shown in FIG. 5 according to the exhaust energy Hex. As shown in FIG. 5, the dead time db is set to a predetermined value db1 in a region where the exhaust energy Hex is not smaller than a predetermined value Hex1, and in a region where Hex<Hex1 holds, it is set to a larger value as the exhaust energy Hex is smaller. This is because as the exhaust energy Hex is smaller, the responsiveness of the supercharger 5 is lower, so that the dead time becomes larger.

Figure 6:
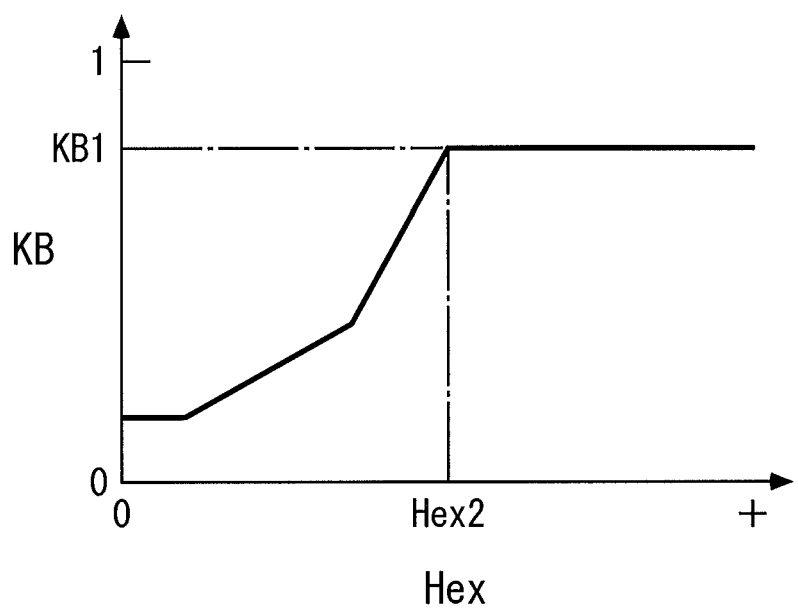
FIG. 6 is an example of a map for use in calculating a lag coefficient KB.

Further, the lag coefficient KB is calculated by searching a map shown in FIG. 6 according to the exhaust energy Hex. The lag coefficient KB is set to a fixed value KB1 (<1) in a region where the exhaust energy Hex is not smaller than a predetermined value Hex2, and in a region where Hex<Hex2 holds, it is set to a smaller value as the exhaust energy Hex is smaller.

This is in order to reflect the fact that in a case where the supercharger 5 is controlled using the driver demand boost pressure PBdsrd as a feedforward control term, the actual boost pressure PBact exhibits a first-order lag characteristic with respect to the driver demand boost pressure PBdsrd before the dead time db. That is, the provisional value PBcmd_bs_tmp of the reference FB target pressure is calculated as a value on which is reflected the response lag characteristic of the actual boost pressure PBact with respect to the driver demand boost pressure PBdsrd.

Further, as is apparent from the equation (2), as the lag coefficient KB is smaller, the immediately preceding value PBcmd_bs (k−1) of the reference FB target pressure is reflected on a calculation result of the provisional value PBcmd_bs_tmp of the reference FB target pressure to a larger degree than the driver demand boost pressure PBdsrd (k−(db(k))) before the dead time db is. Thus, under conditions that the exhaust energy Hex is smaller and the responsiveness of the supercharger 5 is lower, the lag coefficient KB is set as shown in FIG. 6 mentioned above so as to cause the immediately preceding value PBcmd_bs (k−1) of the reference FB target pressure to be more reflected on the result of the calculation of the provisional value PBcmd_bs_tmp of the reference FB target pressure.

Next, the reference FB target pressure PBcmd_bs is calculated by weighted average calculation shown in the following equation (3):

$$PBcmd\_bs(k)=Km(k)\cdot PBcmd\_bs\_tmp(k)+(1-Km(k))\cdot PBact(k) \qquad (3)$$

Figure 7:
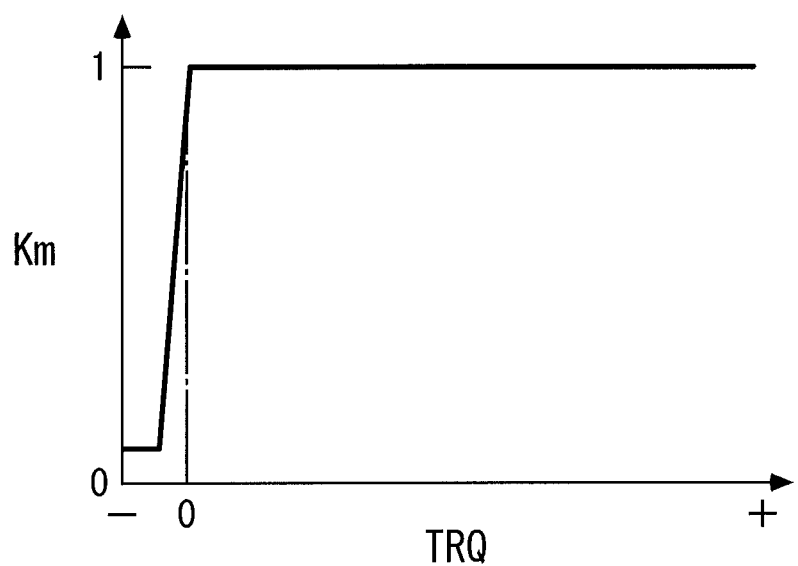
FIG. 7 is an example of a map for use in calculating a deceleration-time weight coefficient Km.

In the equation (3), Km is a deceleration weight coefficient, and specifically, is calculated by searching a map shown in FIG. 7, according to the exhaust energy Hex. As shown in FIG. 7, the deceleration weight coefficient Km is set to the value of 1 in the region where TRQ≥0 holds, and is set to a smaller value as the demanded torque TRQ is smaller in the region where TRQ<0 holds. This is because of the following reason:

As is apparent from the above equation (3), as the deceleration-time weight coefficient Km is smaller, the actual boost pressure PBact is reflected on a calculation result of the reference FB target pressure PBcmd_bs to a larger degree than the provisional value PBcmd_bs_tmp of the reference FB target pressure is. In other words, the provisional value PBcmd_bs_tmp of the reference FB target pressure becomes closer to the actual boost pressure PBact. Thus, when the demanded torque TRQ is in a negative value region and it is during a decelerating fuel cut operation of the engine, the deceleration-time weight coefficient Km is set as shown in the above-described FIG. 7 such that the reference FB target pressure PBcmd_bs is caused to be progressively closer to the actual boost pressure PBact.

Next, a provisional value PBlmt_acp_tmp of the allowable upper limit value is calculated by the following equation (4):

$$PBlmt\_acp\_tmp(k) = PBcmd\_bs(k) + DPB\_ACP \qquad (4)$$

DPB_ACP in the equation (4) represents a predetermined allowable range value, and is set to a positive fixed value.

Next, an allowable upper limit value PBlmt_acp is calculated by the following equation (5):

$$PBlmt\_acp(k) = \text{MIN}(PBlmt\_acp\_tmp(k), PBdsrd(k)) \qquad (5)$$

MIN ( ) in the equation (5) represents a minimum value selection function that selects a minimum value of two values in the parentheses. As is apparent from the equation (5), the allowable upper limit value PBlmt_acp is calculated as a smaller one of the provisional value PBlmt_acp_tmp of the allowable upper limit value and the driver demand boost pressure PBdsrd, so that the allowable upper limit value PBlmt_acp is calculated as a value on which an upper limit process is performed using the driver demand boost pressure PBdsrd as a upper limit value such that the allowable upper limit value PBlmt_acp does not exceed the driver demand boost pressure PBdsrd.

Further, an allowable lower limit value PBlmt_low is calculated by the following equation (6):

$$PBlmt\_low(k) = \text{MIN}(PBlmt\_acp(k), PBact(k)) \qquad (6)$$

As is apparent from the equation (6), the allowable lower limit value PBlmt_low is calculated as a smaller one of the allowable upper limit value PBlmt_acp and the actual boost pressure PBact.

Further, a first provisional value PBcmd_tmp1 of the FB target pressure is calculated by a first-order lag calculation shown in the following equation (7):

$$PBcmd\_tmp1(k) = (1-KB(k)) \cdot PBcmd(k-1) + KB(k) \cdot PBdsrd(k-db(k)) \qquad (7)$$

As is apparent from the equation (7), as the lag coefficient KB is smaller, the immediately preceding value PBcmd (k−1) of the FB target pressure is reflected on a calculation result of the first provisional value PBcmd_tmp1 of the FB target pressure to a larger degree than the driver demand boost pressure PBdsrd (k−(db(k)) before the dead time db is. That is, under conditions that the exhaust energy Hex is smaller and the responsiveness of the supercharger 5 is lower, the immediately preceding value PBcmd (k−1) of the FB target pressure is more reflected on the result of the calculation of the first provisional value PBcmd_tmp1 of the FB target pressure.

Next, a second provisional value PBcmd_tmp2 of the FB target pressure is calculated by weighted average calculation shown in the following equation (8):

$$PBcmd\_tmp2(k) = Km(k) \cdot PBcmd\_tmp1(k) + (1-Km(k)) \cdot PBact(k) \qquad (8)$$

As is apparent from the above equation (8), as the deceleration-time weight coefficient Km is smaller, the actual boost pressure PBact is reflected on a calculation result of the second provisional value PBcmd_tmp2 to a larger degree than the first provisional value PBcmd_tmp1 of the FB target pressure is. As a consequent, the second provisional value PBcmd_tmp2 of the FB target pressure becomes closer to the actual boost pressure PBact when the demanded torque TRQ is in a negative value region and it is during a decelerating fuel cut operation of the engine.

Then, the FB target pressure PBcmd is eventually calculated by the following equation (9):

$$PBcmd(k) = \text{MAX}(PBcmd\_tmp2(k), PBlmt\_low(k)) \qquad (9)$$

MAX ( ) in the equation (9) represents a maximum value selection function that selects a maximum value of two values in the parentheses. As is apparent from the equation (9), the FB target pressure PBcmd is calculated as a larger one of the second provisional value PBcmd_tmp2 of the FB target pressure and the allowable lower limit value PBlmt_low, so that the FB target pressure PBcmd is calculated as a value on which a lower limit process is performed using the allowable lower limit value PBlmt_low as a lower limit value with respect to the second provisional value PBcmd_tmp2 of the FB target pressure.

On the other hand, the above-mentioned subtractor 33 (error calculation means) calculates an error e by the following equation (10):

$$e(k) = PBact(k) - PBcmd(k) \qquad (10)$$

Further, the response-specifying controller calculates a feedback correction term DPBfb by a response-specifying control algorithm expressed by the following equations (11) to (14). In the present embodiment, the response-specifying controller 34 corresponds to the second input value calculation means and the feedback correction term DPBfb corresponds to the second input value.

$$\sigma(k) = e(k) + S \cdot e(k-1) \qquad (11)$$

$$Ueq(k) = \frac{1}{(1-\alpha(k))}\{(1-S-\alpha(k)) \cdot e(k) + S \cdot e(k-1) - c(k)\} \qquad (12)$$

$$Urch(k) = \frac{Krch}{(1-\alpha(k))} \cdot \sigma(k) \qquad (13)$$

$$DPBfb(k) = Ueq(k) + Urch(k) \qquad (14)$$

In the above equation (11), σ represents a switching function and S represents a switching function setting parameter that is set such that −1<S<0 holds. Further, in the above equation (12), Ueq, α, and c represent an equivalent control input, a model parameter of a control target model, described hereinafter, and a disturbance estimated value, respectively. The model parameter α and the disturbance estimated value c are identified onboard by the onboard identifier 35, as described hereinafter.

Further, in the above equation (13), Urch represents a reaching law input, and Krch represents a reaching law gain. The reason for calculating the feedback correction term DPBfb using the above-mentioned control algorithm will be described hereinafter.

On the other hand, the above-mentioned onboard identifier 35 (identification means) calculates a model parameter vector θ with an identification algorithm expressed by the following equations (15) to (23):

$$\theta(k) = \lambda \cdot \theta(k-1) + KP(k) \cdot eid(k) \qquad (15)$$

$$\theta^T(k) = [\alpha(k) \quad c(k)] \qquad (16)$$

$$eid(k) = V(k) - V\_hat(k) \qquad (17)$$

$$V(k) = e(k) - DPBfb(k) \qquad (18)$$

-continued $$V\_hat(k) = \alpha(k) \cdot (e(k-1) - DPBfb(k)) + c(k) \quad (19)$$
$$= \theta^T(k) \cdot \zeta(k)$$

$$\zeta^T(k) = [e(k-1) - DPBfb(k-1) \quad 1] \quad (20)$$

$$KP(k) = \frac{P \cdot \zeta(k)}{1 + \zeta^T(k) \cdot P \cdot \zeta(k)} \quad (21)$$

$$\lambda = \begin{bmatrix} \lambda 1 & 0 \\ 0 & \lambda 2 \end{bmatrix} \quad (22)$$

$$P = \begin{bmatrix} P1 & 0 \\ 0 & P2 \end{bmatrix} \quad (23)$$

As expressed by the above equation (16), the model parameter vector θ is defined as a vector that is composed of the elements of the model parameter α and the disturbance estimated value c. Further eid in the equation (15) represents an identification error that is calculated by the equation (17), and V in the equation (17) represents a virtual controlled variable calculated by the equation (18). Further, V_hat in the equation (17) represents an estimated value of the virtual controlled variable calculated by the equation (19), and ζ in the equation (19) represents a vector of which a transposed matrix is defined as expressed by the equation (20).

Further, λ in the equation (15) represents a forgetting matrix that is defined as expressed by the equation (22), and elements λ1 and λ2 of the forgetting matrix are both set to a value that is not larger than 1. Further, KP in the equation (15) represents an identification gain that is defined as expressed by the equation (21). P in the equation (21) represents an identification gain matrix that is defined as expressed by the equation (23), and elements P1 and P2 of the identification gain matrix are both set to positive values. A method of deriving the above identification algorithm will be described hereinafter.

Further, the above-mentioned adder 36 calculates a demanded boost pressure PBrqr by the following equation (24). In the present embodiment, the adder 36 corresponds to the demanded boost pressure PBrqr and the control input calculation means corresponds to the control input.

$$PBrqr(k) = PBdsrd(k) + DPBfb(k) \quad (24)$$

Further, the above-mentioned divider 37 calculates the demanded pressure ratio RPBrqr, by the following equation (25):

$$RPBrqr(k) = \frac{PBrqr(k)}{PA(k)} \quad (25)$$

Figure 8:
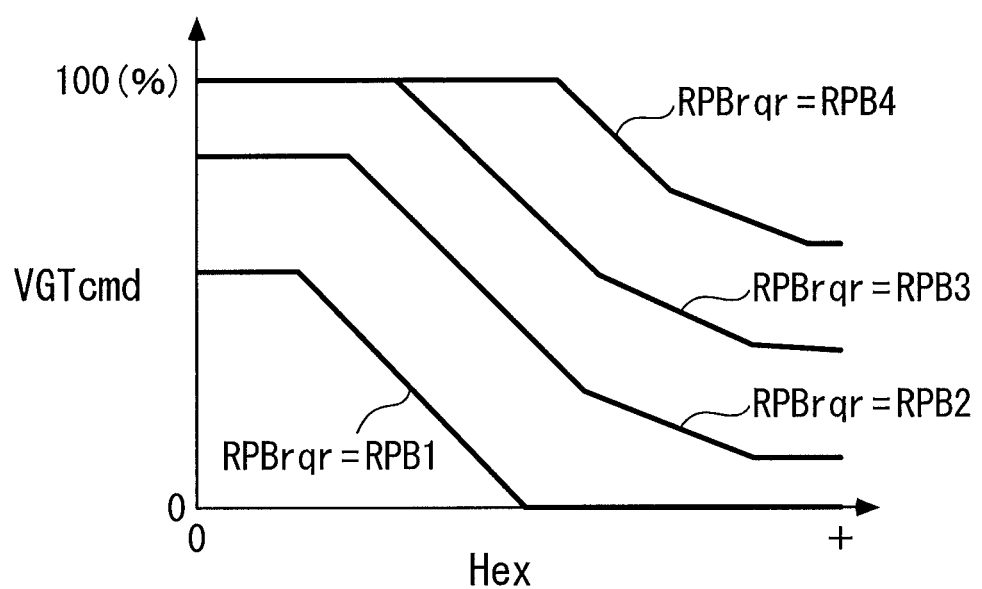
FIG. 8 is an example of a map for use in calculating a target vane opening VGTcmd.

Next, the above-mentioned target vane opening calculation section 38 calculates a target vane opening VGTcmd by searching a map shown in FIG. 8 according to the exhaust energy Hex and the demanded pressure ratio RPBrqr. The target vane opening VGTcmd is a value which serves as a target of the opening degree of the variable vane 5c. In FIG. 8, RPB1 to RPB 4 represent predetermined values of the demanded pressure ratio RPBrqr set such that RPB1<RPB2<RPB3<RPB4 holds.

In this map, the target vane opening VGTcmd is set to a smaller value as the exhaust energy Hex is larger in a region where the exhaust energy Hex is large. This is for releasing an excess energy to a location downstream of the turbine blade 5b as an energy of exhaust gases in order to maintain the boost pressure PB at the FB target pressure PBcmd, because in a region where the exhaust energy Hex is large, the exhaust energy Hex becomes sufficiently larger than the energy required for the compressor blade 5a of the supercharger 5 to compress intake pressure to the FB target pressure PBcmd. Further, the target vane opening VGTcmd is set to a larger value in order to obtain a larger boost pressure as the demanded pressure ratio RPBrqr is larger.

After the target vane opening VGTcmd is calculated by the above-mentioned target vane opening calculation section 38 as described above, a control input signal corresponding to the target vane opening VGTcmd is supplied to the vane actuator 5d of the supercharger 5, whereby the actual boost pressure PBact is feedback-controlled such that it follows the FB target pressure PBcmd, and when the demanded boost pressure PBrqr is in a steady state, it is controlled such that the actual boost pressure PBact becomes equal to the demanded boost pressure PBrqr.

Next, the reason for using the above-mentioned equations (11) to (14) as a calculation algorithm for the feedback correction term DPBfb in the above-mentioned response-specifying controller 34 will be described.

First, when considering, as to a boost pressure control system, a controlled object to be controlled using the demanded boost pressure PBrqr as a control input and the actual boost pressure PBact as a controlled variable, the actual boost pressure PBact has a response lag with respect to the demanded boost pressure PBrqr. Therefore, by modeling the controlled object, a control target model is obtained which is expressed by the following equation (26):

$$PBact(k) = a \cdot PBact(k-1) + b \cdot PBrqr(k-1) + c \quad (26)$$

In the above equation (26), a and b represent lag element model parameters. By applying to the control target mode the control algorithm disclosed in the Publication of Japanese Patent No. 4282572, as a method of calculating the demanded boost pressure PBrqr as a feedback control input, there are obtained the following equations (27) to (31):

$$e(k) = PBact(k) - PBcmd(k) \quad (27)$$

$$\sigma(k) = e(k) + S \cdot e(k-1) \quad (28)$$

$$Ueq(k) = \quad (29)$$
$$\frac{1}{b(k)}\{(1 - S - a(k)) \cdot PBact(k) + S \cdot PBact(k-1) + PBcmd(k) +$$
$$(S - 1) \cdot PBcmd(k-1) - S \cdot PBcmd(k-2) - c(k)\}$$

$$Urch(k) = \frac{Krch}{b(k)} \cdot \sigma(k) \quad (30)$$

$$PBrqr(k) = Ueq(k) + Urch(k) \quad (31)$$

With the configuration of the present embodiment, as described above, the demanded boost pressure PBrqr is calculated as the sum of the driver demand boost pressure PBdsrd and the feedback correction term DPBfb, so that calculation formulas for calculating the feedback correction term DPBfb are obtained by replacing PBrqr representative of the demanded boost pressure in the above equations (27) to (31) by DPBfb representative of the feedback correction term. Further, discrete data a(k) and b(k) of the lag element model parameters and c(k) of the disturbance estimated value are identified by the identification algorithm disclosed in the Publication of Japanese Patent No. 4282572.

In this case, as is apparent from the above equation (29), the equivalent control input Ueq includes therein the target boost pressure PBcmd. The target boost pressure PBcmd is, as described above, a value on which is reflected the response lag of the actual boost pressure PBact with respect to the demanded boost pressure PBrqr, so that the equivalent control input Ueq, which includes therein such a value, has a characteristic of a feedforward control term. Consequently, the feedback correction term DPBfb includes therein a feedforward control term.

Accordingly, when the demanded boost pressure PBrqr is calculated as the sum of such feedback correction term DPBfb and the driver demand boost pressure PBdsrd, the feedforward control term included in the feedback correction term DPBfb and the driver demand boost pressure PBdsrd as the feedforward control term interfere with each other, which may cause degradation of control accuracy. Particularly, control accuracy may be significantly degraded by a deadbeat control characteristic of the equivalent control input Ueq included in the feedback correction term DPBfb. Further, with a controlled object that has a large response lag, it is often the case that an actuator of the controlled object is incapable of following up changes in input required to realize the equivalent control input Ueq, and in a case where the equivalent control input Ueq is used for such a controlled object, there may occur degradation of control accuracy such as occurrence of oscillating behavior.

To avoid the above problems, in the present embodiment, the relationship between the feedback correction term DPBfb and the error e is regarded as a first-order lag system, and a control target model of a discrete-time system is set which is expressed by the following equation (32):

$$e(k) = \alpha \cdot e(k-1) + (1-\alpha) \cdot DPBfb(k-1) + c \quad (32)$$

Here, by applying the response-specifying control algorithm to a control target model in which a target value of the error e is represented by er, and the model parameter α and the disturbance estimated value c in the above equation (32) are converted to discrete data, there are obtained the following equations (33) to (36):

$$\sigma(k) = e(k) + S \cdot e(k-1) \quad (33)$$

$$Ueq(k) = \frac{1}{(1-\alpha(k))} \{(1 - S - \alpha(k)) \cdot e(k) + S \cdot e(k-1) + er(k) + (S-1) \cdot er(k-1) - S \cdot er(k-2) - c(k)\} \quad (34)$$

$$Urch(k) = \frac{Krch}{(1-\alpha(k))} \cdot \sigma(k) \quad (35)$$

$$DPBfb(k) = Ueq(k) + Urch(k) \quad (36)$$

In this case, when considering that the aim of the feedback correction term DPBfb is to eliminate the error e, the target value er of the error e in the above equation (34) gives er(k)=er(k−1)=er(k−2)=0, and hence by substituting er(k)=er(k−1)=er(k−2)=0 into the equation (34), the above-mentioned equation (12) is obtained. Consequently, as calculation formulas for calculating the feedback correction term DPBfb, the above-mentioned equations (11) to (14) are obtained.

Further, the identification algorithm for the model parameter α(k) and the disturbance estimated value c(k) in the above equation (34) is derived as follows. First, after converting the model parameter α and the disturbance estimated value c in the above-mentioned equation (32) into discrete data, by arranging the equation (32), there is obtained the following equation (37):

$$e(k) - DPBfb(k) = \alpha(k) \cdot (e(k-1) - DPBfb(k)) + c(k) \quad (37)$$

When the left side of the above equation (37) is defined as the virtual controlled variable V and the right side of the same is defined as the estimated value V_hat of the virtual controlled variable, and the sequential identification algorithm including the forgetting algorithm is applied to the equation (37) such that the error between the virtual controlled variable V and the estimated value V_hat of the virtual controlled variable is minimized, the above-mentioned equations (15) to (23) are obtained.

Figure 9:
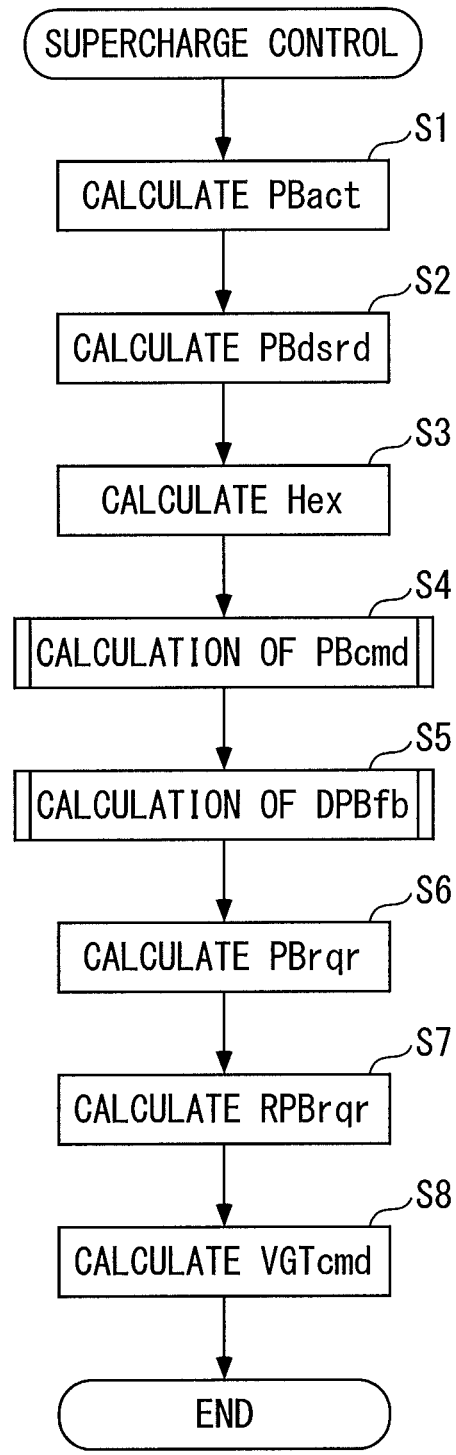
FIG. 9 is a flowchart of a supercharge control process.

Next, a description will be given of the supercharge control process with reference to FIG. 9. The supercharge control process controls the actual boost pressure PBact using the above-described control algorithm, and is performed at a predetermined control period ΔT (e.g. 10 msec).

First, in a step 1 (shown as S1 in abbreviated form in FIG. 9; the following steps are also shown in abbreviated form), the actual boost pressure PBact is calculated based on the detection signal from the boost pressure sensor 22.

Next, the process proceeds to a step 2, wherein as described above, the driver demand boost pressure PBdsrd is calculated by searching a map shown in FIG. 4 according to the demanded torque TRQ and the engine speed NE. Next, in a step 3, the exhaust energy Hex is calculated by the above-mentioned equation (1).

In a step 4 following the step 3, the FB target pressure PBcmd is calculated with the control algorithm of the above-mentioned equations (2) to (9).

Next, the process proceeds to a step 5, wherein the model parameter α and the disturbance estimated value c are calculated with the identification algorithm of the above-mentioned equations (15) to (23), and the feedback correction term DPBfb is calculated using the results of calculation of the model parameter α and the disturbance estimated value c, and the response-specifying control algorithm of the above-mentioned equations (10) to (14).

Next, in a step 6, the demanded boost pressure PBrqr is calculated by the above-mentioned equation (24).

In a step 7 following the step 6, the demanded pressure ratio RPBrqr is calculated by the above-mentioned equation (25).

In a step 8 following the step 7, as described above, the target vane opening VGTcmd is calculated by searching a map shown in FIG. 8 according to the exhaust energy Hex and the demanded pressure ratio RPBrqr, followed by terminating the present process.

Figure 10:
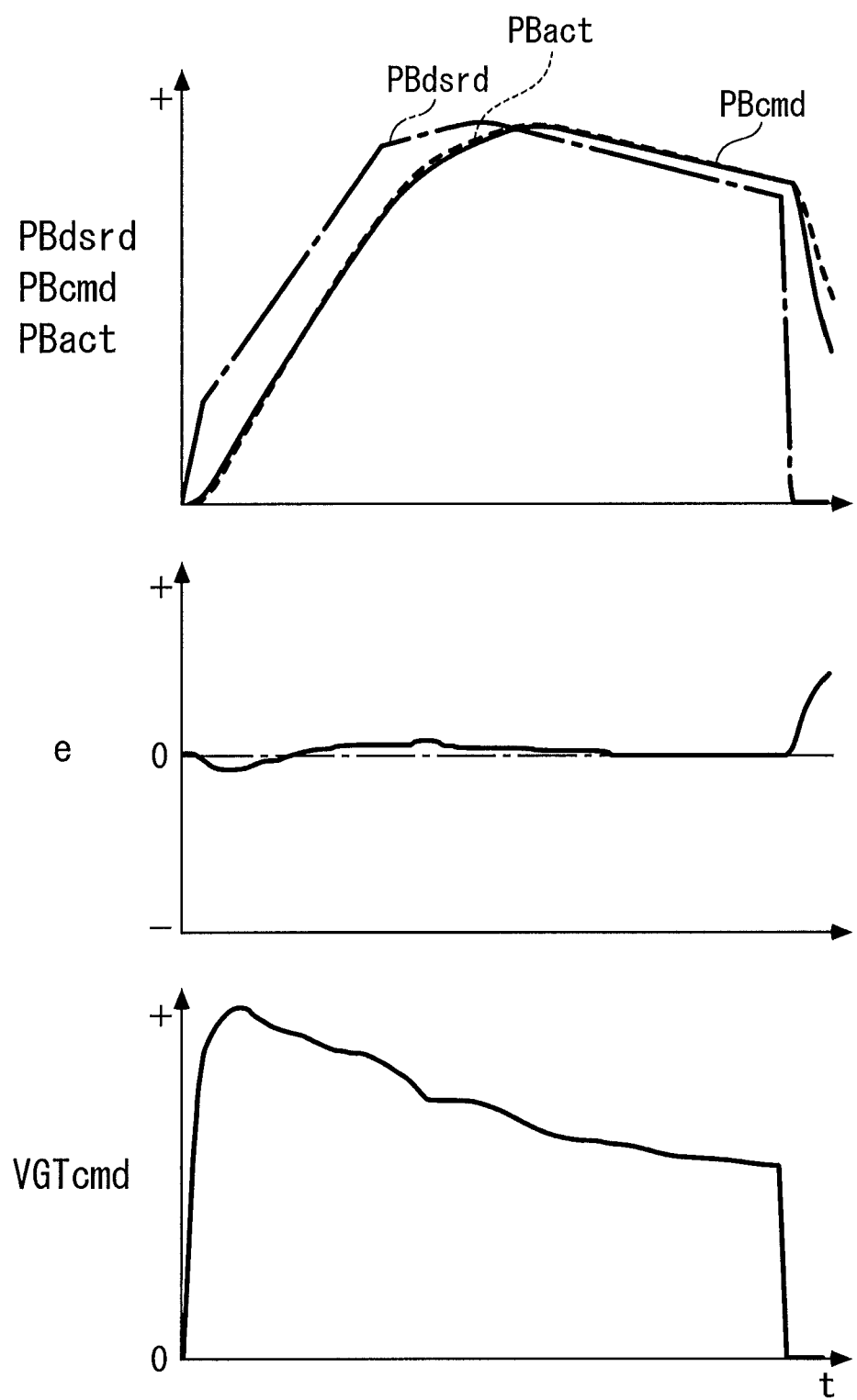
FIG. 10 is a timing diagram showing results of a simulation of the supercharge control according to the first embodiment.

Next, a description will be given of results of a simulation of the supercharge control process which is performed by the control apparatus 1 according to the present embodiment configured as described above (hereinafter referred to as "control results"). FIG. 10 shows control results by the control apparatus 1 according to the present embodiment (hereinafter referred to as the "present control results"), and FIG. 11 shows, for comparison, control results in a case where a PID control algorithm is used as a calculation algorithm for the feedback correction term DPBfb (hereinafter referred to as "the comparative control results").

Figure 11:
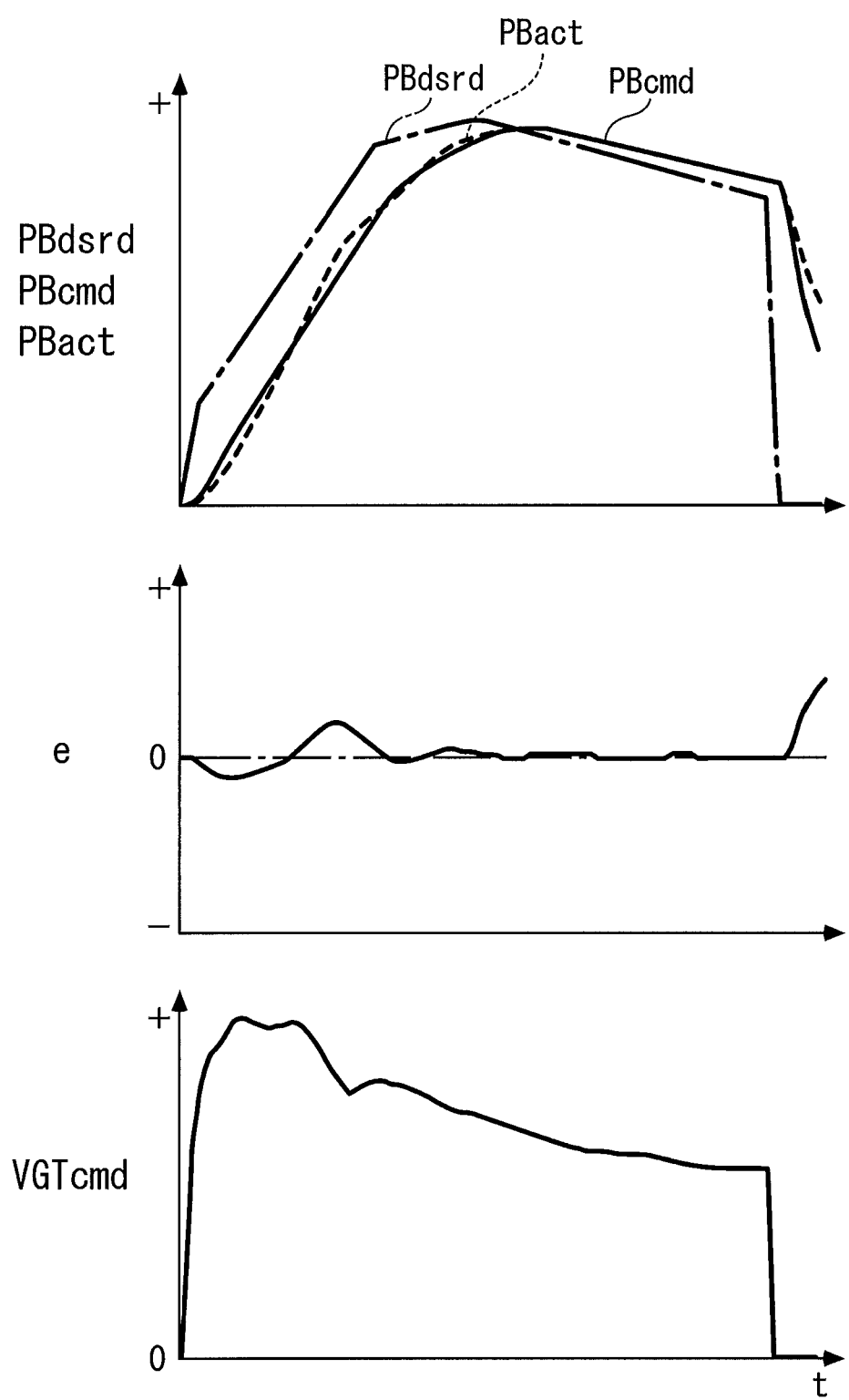
FIG. 11 is a timing diagram showing, for comparison, results of a simulation of the supercharge control performed using a PID control algorithm as a calculation formula for calculating an FB target pressure PBcmd.

As is apparent from FIGS. 10 and 11, in the present control results, compared with the comparative control results, the absolute value of the error e is suppressed to a smaller value, and the overshoot of the actual boost pressure PBact with respect to the FB target pressure PBcmd and the fluctuation behavior are more properly suppressed. From the above it is understood that high control accuracy is ensured. Further, in the present control results, in spite of the fact that the absolute value of the error e is suppressed to a smaller value with respect to the behavior of the target vane opening VGTcmd that serves as a substantial control input, the actual boost pressure PBact, as a controlled variable, shows a smooth behavior. From the above, it is understood that the response lag is properly compensated for.

As described above, with the control apparatus 1 according to the first embodiment, the driver demand boost pressure PBdsrd is calculated by searching the map in FIG. 4 as a feedforward control term for feedforward-controlling the actual boost pressure PBact. Further, the FB target pressure PBcmd is calculated with the control algorithm of the equations (2) to (9), as a value on which is reflected the response lag of the actual boost pressure PBact with respect to the driver demand boost pressure PBdsrd, and the error e is calculated as a difference between the actual boost pressure PBact and the FB target pressure PBcmd. Further, by applying the response-specifying control algorithm to the control target model (equation (32)) which defines the relationship between the error e, the feedback correction term DPBfb, and the disturbance estimated value c, the feedback correction term DPBfb is calculated as the sum of the equivalent control input Ueq and the reaching law input Urch. Then, the demanded boost pressure PBrqr is calculated as a control input by adding the feedback correction term DPBfb to the driver demand boost pressure PBdsrd.

In this case, differently from the method disclosed in the Publication of Japanese Patent No. 4282572, the equivalent control input Ueq is not a feedforward control term that includes therein the disturbance estimated value c, the controlled variable (actual boost pressure PBact), and the target value (FB target pressure PBcmd) as variables, but is calculated such that it includes therein the error e and the disturbance estimated value c as variables as expressed by the equation (12). Therefore, it is possible to calculate the equivalent control input Ueq as a value without a deadbeat control characteristic with respect to the change of the target value, and with a high disturbance compensation capability. Therefore, since the demanded boost pressure PBrqr as a control input is calculated by adding the feedback correction term DPBfb calculated as the sum of such equivalent control input Ueq and the reaching law input Urch to the demanded boost pressure PBrqr that is a feedforward control term, it is possible to control the actual boost pressure PBact by the demanded boost pressure PBrqr while avoiding mutual interference between the equivalent control input Ueq and the driver demand boost pressure PBdsrd.

In addition, the effects of the disturbance estimated value c make it possible to accurately control the actual boost pressure PBact that has a response lag characteristic, while suppressing follow-up lag and occurrence of the overshoot. As a result, it is possible to ensure high control accuracy when the actual boost pressure PBact that has a response lag characteristic is controlled by combining the feedforward control method, the response-specifying control method, and the disturbance compensation method.

Further, in a case where the control target model in which the model parameter $\alpha$ and the disturbance estimated value c in the equation (32) are converted to discrete data is arranged as expressed by the equation (37), and the left and right sides of the equation (37) are defined as the virtual controlled variable V and the estimated value V_hat of the virtual controlled variable, respectively, the model parameter vector $\theta$ that is composed of the elements of model parameter $\alpha$ and the disturbance estimated value c is identified with the sequential identification algorithm of the equations (15) to (19) such that the error between the virtual controlled variable V and the estimated value V_hat of the virtual controlled variable is minimized. That is, it is possible to identify onboard the model parameter $\alpha$ and the disturbance estimated value c.

In this case, although the equation (32) forms a model equation of the first-order lag system when the disturbance estimated value c is eliminated therefrom, it is preferable to identify the relationship between the feedback correction term DPBfb that is an input, and the error e that is an output, as a first-order lag system which does not generate a steady-state deviation in order to control a convergence behavior of the error e to the value of 0 with higher accuracy. On the other hand, in the case of the equation (32), two model parameters $\alpha$ and $1-\alpha$ by which the output and the input are multiplied are set such that the restraint condition is satisfied, which makes it possible to identify the relationship as a first-order lag system that does not generate a steady-state deviation. Further, identification of the model parameter $\alpha$ such that the restraint condition is satisfied makes it possible to improve identification accuracy of the disturbance estimated value c. By thus identifying the response lag characteristic, the gain characteristic thereof, and the disturbance estimated value c individually, it is possible to accurately compensate for the modeling error even when the modeling error in the control target model is increased due to variation in individual products of the controlled object and aging of the same, and thereby further improve the control accuracy.

Further, in the case of the actual boost pressure PBact that is changed by the supercharger 5 of the engine 3, due to the low operating accuracy and the low responsiveness of the vane actuator 5d of the supercharger 5, generally, the response lag of the actual boost pressure PBact with respect to the demanded boost pressure PBrqr that is a control input is significantly large. However, according to the control apparatus 1, when such actual boost pressure PBact of which the response lag is significantly large is controlled by combining the feedforward control method, the response-specifying control method, and the disturbance compensation method, it is possible to ensure high control accuracy and improve marketability.

Although in the first embodiment, the exhaust energy Hex is calculated by the above-mentioned equation (1), by way of example, but the exhaust energy Hex may be calculated by the following equation (38):

$$Hex = Cp \cdot TA \left[ Gair + Gfuel \cdot \frac{(1 - \eta eng) \cdot Qfuel + Cp \cdot TA}{Cp \cdot TA} \right] \quad (38)$$

In the equation (38), Cp, TA, Qfuel, and $\eta$eng represent constant pressure specific heat of air, intake temperature, a calorific value of fuel, and engine efficiency, respectively. In the case of using the above equation (38), compared with the case of using the above-mentioned equation (1), it is possible to enhance the calculation accuracy of the exhaust energy Hex. Further, under a condition that the calculation accuracy of the exhaust energy Hex may be lower, in the equation (1), by setting Ka=0, a calculation formula of Hex=Gair may be used.

Further, although in the first embodiment, the model parameter $\alpha$ and the disturbance estimated value c are identified onboard with the identification algorithm of the above-mentioned equations (15) to (23) by the onboard identifier 35, by way of example, the model parameter $\alpha$ and the disturbance estimated value c may be calculated by a method in which a parameter scheduler and an adaptive disturbance observer are combined, as described as follows:

The model parameter α is calculated by searching a map shown in FIG. 12 according to the exhaust energy Hex using the parameter scheduler method. Further, the disturbance estimated value c is calculated by application of the adaptive disturbance observer, with a fixed gain identification algorithm expressed by the following equations (39) to (41):

$$e\_hat(k) = \alpha(k-1) \cdot e(k-1) + \{1 - \alpha(k-1)\} \cdot DPBfb(k-1) + c(k-1) \quad (39)$$

$$eid'(k) = e(k) - e\_hat(k) \quad (40)$$

$$c(k) = c(k-1) + \frac{P'}{1+P'} \cdot eid'(k) \quad (41)$$

In the equation (39), e_hat represents an estimated value of the error, and eid' in the equation (40) represents an estimated error. Further, P' in the equation (41) represents an identification gain of a fixed value.

Even when the model parameter α and the disturbance estimated value c are calculated by the above-described methods, it is possible to obtain the same advantageous effects as provided by the methods according to the first embodiment. That is, even under a condition that the modeling error in the control target model is increased e.g. due to variation in individual products of the supercharger 5 and aging of the same, it is possible to accurately compensate for the modeling error by the disturbance estimated value c, and ensure high control accuracy.

Further, although in the control apparatus 1 according to the first embodiment, the controlled object is considered to have a first-order lag characteristic, and the model (equation (32)) of the first-order lag system is used as a control target model, by way of example, the controlled object may be considered to have a second-order lag characteristic, and the control algorithm may be used which is described as follows:

First, when considering that a controlled object in which the error e as a controlled variable has a second-order lag characteristic with respect to the feedback correction term DPBfb as a control input, the control target model thereof is expressed by the following equation (42):

$$e(k) = \beta1 \cdot e(k-1) + \beta2 \cdot e(k-2) + (1-\beta1-\beta2) \cdot DPBfb(k-1) + c \quad (42)$$

In the equation (42), β1 and β2 represent model parameters.

By applying the response-specifying control algorithm to the control target model in which the model parameters β1, β2 and the disturbance estimated value c in the equation (42) are converted to discrete data, there are obtained the following equations (43) to (46):

$$\sigma(k) = e(k) + S \cdot e(k-1) \quad (43)$$

$$Ueq(k) = \frac{1}{(1-\beta1(k)-\beta2(k))} \cdot \{(1-S-\beta1(k)) \cdot e(k) + (S-\beta2(k)) \cdot e(k-1) - c(k)\} \quad (44)$$

$$Urch(k) = \frac{Krch}{(1-\beta1(k)-\beta2(k))} \cdot \sigma(k) \quad (45)$$

$$DPBfb(k) = Ueq(k) + Urch(k) \quad (46)$$

Further, the model parameters β1, β2 and the disturbance estimated value c in the above equations (44) and (45) are calculated, similarly to the first embodiment, by defining the virtual controlled variable V and the estimated value V_hat of the virtual controlled variable as expressed by the following equations (47) to (50), and by applying the sequential identification algorithm such that the error between the virtual controlled variable V and the estimated value V_hat of the virtual controlled variable is minimized.

$$V(k) = e(k) - DPBfb(k) \quad (47)$$

$$V\_hat(k) = \beta1(k) \cdot (e(k-1) - DPBfb(k-1)) + \beta2(k) \cdot (e(k-2) - DPBfb(k-1)) + c(k) \quad (48)$$

$$= \theta^T(k) \cdot \zeta(k)$$

$$\theta^T(k) = [\beta1(k) \quad \beta2(k) \quad c(k)] \quad (49)$$

$$\zeta^T(k) = [e(k-1) - DPBfb(k) \quad e(k-2) - DPBfb(k) \quad 1] \quad (50)$$

Although in the control target model expressed by the above-mentioned equation (42), the model parameter by which the feedback correction term DPBfb is multiplied is defined as (1−β1−β2) so as to prevent the error e from generating a steady-state deviation with respect to the feedback correction term DPBfb, this restraint condition may be cancelled, and an independent model parameter γ may be used as a model parameter by which the feedback correction term DPBfb is multiplied.

Further, although in the first embodiment, the feedback correction term DPBfb that is a sum of the equivalent control input Ueq and the reaching law input Urch is used as the second input value, by way of example, the second input value according to the present invention is not limited to this, but there may be used any other suitable value insofar as it is a value that is calculated using a sum of the equivalent control input and the reaching law input. For example, the feedback correction term DPBfb as the second input value may be calculated as a value Ueq+Urch+Unl in which a non-linear input Unl is added in addition to the equivalent control input Ueq and the reaching law input Urch.

Figure 13:
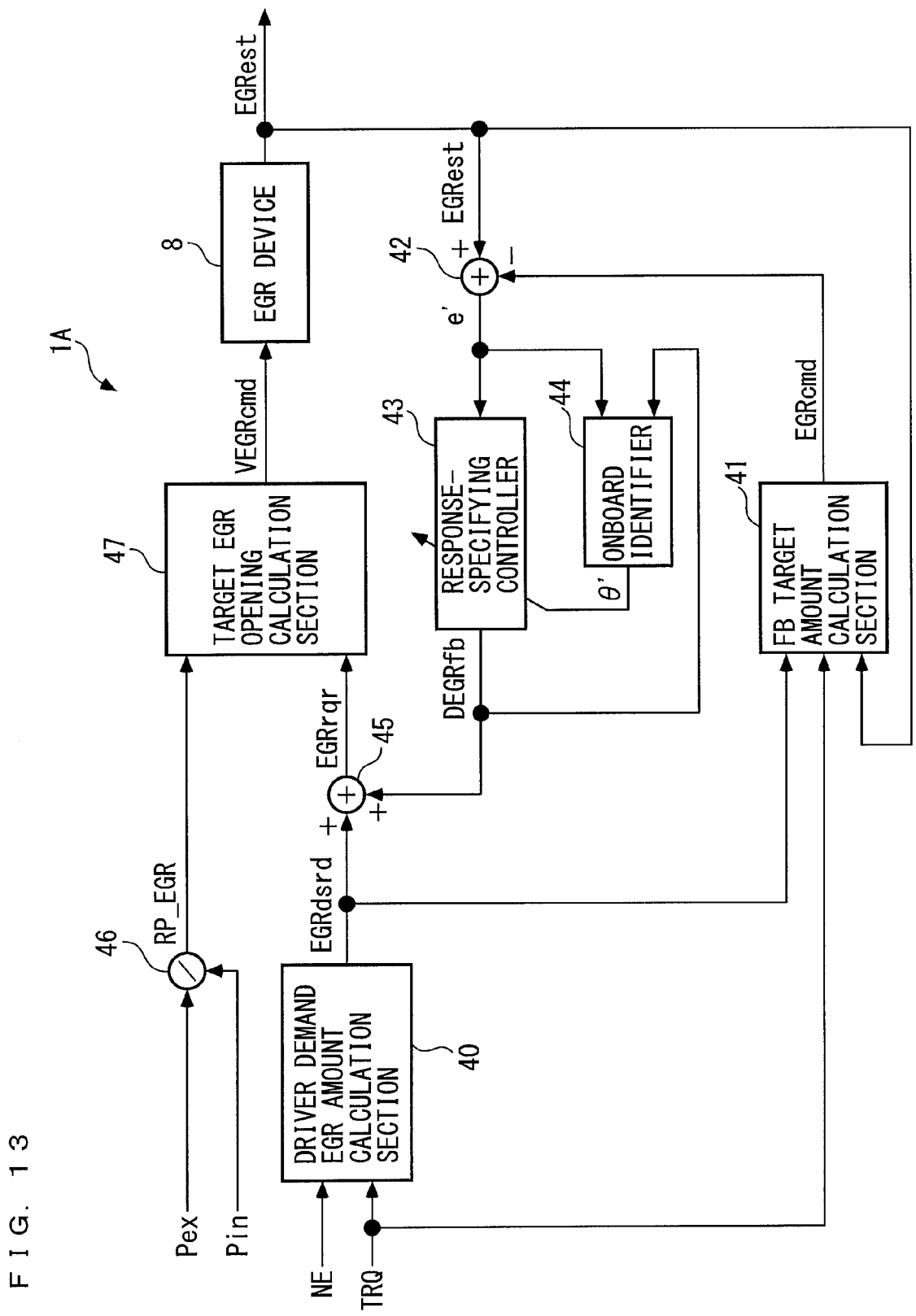
FIG. 13 is a functional block diagram of a control apparatus according to a second embodiment.

Next, a description will be given of a control apparatus 1A according to a second embodiment of the present invention with reference to FIG. 13. The control apparatus 1A according to the present embodiment controls an EGR amount EGRest as a controlled variable by a demanded EGR amount EGRrqr as a control input, using a method similar to the method of the control apparatus 1 according to the first embodiment. As described hereinafter, the control apparatus 1A according to the present embodiment has the same electrical and mechanical arrangements as those of the control apparatus 1 according to the first embodiment, except part of them, so that hereinafter the same components as those of the first embodiment are denoted by the same reference numerals and description thereof is omitted.

The control apparatus 1A, as described hereafter, calculates a target EGR opening VEGRcmd by a method similar to the method employed. The control apparatus 1A includes a driver demand EGR amount calculation section 40, an FB target amount calculation section 41, a subtractor 42, a response-specifying controller 43, an onboard identifier 44, an adder 45, a divider 46, and a target EGR opening calculation section 47, and specifically, these elements 40 to 47 are implemented by the ECU 2.

In the present embodiment, the ECU 2 corresponds to controlled variable detection means, first input value calculation means, error calculation means, second input value calculation means, control input calculation means, target value calculation means, and identification means.

First, in the driver demand EGR amount calculation section 40, a driver demand EGR amount EGRdsrd is calculated by searching a map, not shown, according to the engine speed NE and the demanded torque TRQ. In the present embodiment, the driver demand EGR amount calculation section 40 correspond to the first input value calculation means and the driver demand EGR amount EGRdsrd correspond to the first input value.

Further, the FB target value calculation section 41 calculates an FB target value EGRcmd by a method similar to the method employed by the above-described FB target pressure calculation section 32. Specifically, the FB target value EGRcmd is calculated using equations each formed by replacing PB in each parameter in the above-mentioned equations (2) to (9) by EGR.

That is, the FB target value EGRcmd is calculated by equations in which the PBcmd_bs representative of reference FB target pressure is replaced by EGRcmd_bs representative of a reference FB target amount, PBdsrd representative of the driver demand boost pressure by EGRdsrd representative of a driver demand EGR amount, DPB_ACP representative of the predetermined allowable range value by DEGR_ACP representative of a predetermined allowable range value, PBlmt_acp representative of the allowable upper limit value by EGRlmt_acp representative of an allowable upper limit value, and DPBfb representative of the feedback correction term by DEGRfb representative of a feedback correction term.

In the present embodiment, the FB target amount calculation section 41 corresponds to the target value calculation means and the FB target amount EGRcmd corresponds to the target value.

Further, the subtractor 42 (error calculation means) calculates an error e' as a difference between the EGR amount EGRest and the FB target amount EGRcmd (EGRest−EGRcmd). In this case, the EGR amount EGRest is calculated based on a detection signal from an EGR amount sensor, not shown. Note that the EGR amount EGRest may be calculated based on other parameters (e.g. an intake air flow rate Gair and an air fuel ratio of exhaust gases).

On the other hand, the response-specifying controller 43 calculates the feedback correction term DEGRfb with the control algorithm similar to that of the above-mentioned response-specifying controller 34. More specifically, the feedback correction term DEGRfb is calculated by equations formed from the above-mentioned equations (11) to (14) by replacing DPBfb representative of the feedback correction term by DEGRfb representative of the feedback correction term, and e representative of the error by "error e'". In the present embodiment, the response-specifying controller 43 corresponds to the second input value calculation means and the feedback correction term DEGRfb corresponds to the second input value.

Further, the onboard identifier 44 (identification means) calculates a model parameter vector θ' with the identification algorithm similar to that of the above-mentioned onboard identifier 35. Specifically, the model parameter θ' is calculated by equations formed from the above-mentioned equations (15) to (23) by replacing θ representative of the model parameter vector by θ' representative of the model parameter vector, and e representative of the error by error e' representative of the error, and DPBfb representative of the feedback correction term by DEGRfb representative of the feedback correction term.

Further, the adder 45 calculates the demanded EGR amount EGRrqr by adding the feedback correction term DEGRfb to the driver demand EGR amount EGRdsrd. In the present embodiment, the adder 45 corresponds to the control input calculation means and the demanded EGR amount EGRrqr corresponds to the control input.

Further, the divider 46 calculates a pressure ratio RP_EGR by dividing an exhaust pressure Pex by an intake pressure Pin. The pressure ratio RP_EGR is a ratio between a pressure on an upstream side of the EGR control valve 8c and a pressure on a downstream side of the same, and the exhaust pressure Pex and the intake pressure Pin are detected by respective pressure sensors, not shown.

Then, the target EGR opening calculation section 47 calculates the target EGR opening VEGRcmd by searching a map, not shown, according to the demanded EGR amount EGRrqr and the pressure ratio RP_EGR. After the target EGR opening VEGRcmd is thus calculated, a control input signal corresponding thereto is supplied to the EGR control valve 8c. This controls the EGR amount EGRest, as a controlled variable, such that it follows the FB target amount EGRcmd, and such that it become equal to the driver demand EGR amount EGRdsrd when the driver demand EGR amount EGRdsrd is in a steady state.

According to the control apparatus 1A, by the above-described control method, it is possible to obtain the same advantageous effects as provided by the control apparatus 1 according to the first embodiment. That is, differently from the method disclosed in the Publication of Japanese Patent No. 4282572, the equivalent control input Ueq included in the feedback correction term DEGRfb is not a feedforward control term that includes therein the disturbance estimated value c, the controlled variable, and the target value thereof, as variables, but is calculated such that it includes therein the model parameter α, the error e', and the disturbance estimated value c, as variables. Therefore, it is possible to control the EGR amount EGRest by the demanded EGR amount EGRrqr, while avoiding mutual interference between the equivalent control input Ueq and the driver demand EGR amount EGRdsrd.

Further, the disturbance-compensating effects of the disturbance estimated value c make it possible to accurately control the EGR amount EGRest that has a response lag characteristic, while suppressing follow-up lag and occurrence of the overshoot. From the above, it is possible to ensure high control accuracy when the EGR amount EGRest that has a response lag characteristic is controlled by combining the feedforward control method, the response-specifying control method, and the disturbance compensation method.

Further, the model parameter α and the disturbance estimated value c can be identified onboard, and hence even when the modeling error in the control target model is increased due to variation in individual products of the controlled object and aging thereof, it is possible to accurately compensate for the modeling error and thereby further improve the control accuracy.

Further, in the case of the EGR amount EGRest that is changed by the EGR device 8 of the engine 3, due to the low operating accuracy and the low responsiveness of the EGR control valve 8c, and due to the fact that it takes time for the recirculated gases to be recirculated to an intake system, generally, the response lag of the EGR amount EGRest is significantly large with respect to the demanded EGR amount EGRrqr that is a control input. However, with the control apparatus 1A, when such EGR amount EGRest of which the response lag is significantly large is controlled by combining the feedforward control method, the response-specifying control method, and the disturbance compensation method, it is possible to ensure high control accuracy and improve marketability thereof.

Although in the second embodiment, the EGR amount EGRest is used as a controlled variable, instead of this, the EGR rate may be used as a controlled variable.

Figure 14:
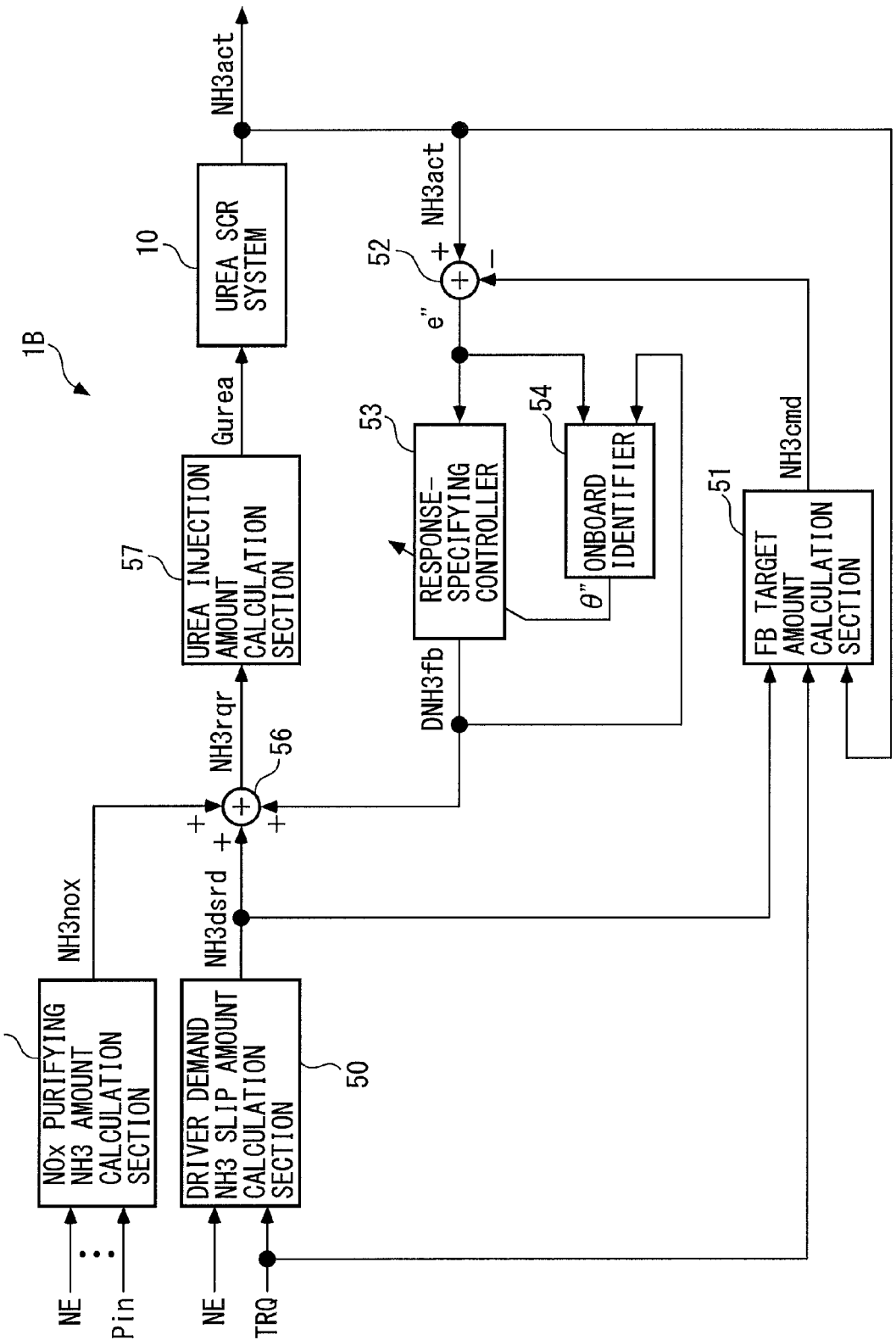
FIG. 14 is a functional block diagram of a control apparatus according to a third embodiment.

Next, a description will be given of a control apparatus 1B according to a third embodiment of the present invention with reference to FIG. 14. The control apparatus 1B according to the present embodiment controls the NH3 slip amount NH3act as a controlled variable by a demanded NH3 slip amount NH3rqr as a control input, by a method similar to the method employed in the control apparatus 1 according to the first embodiment. The control apparatus 1B according to the present embodiment has the same electrical and mechanical arrangements as those of the control apparatus 1 according to the first embodiment, except part of them, so that hereinafter the same components as those of the first embodiment are denoted by the same reference numerals and description thereof is omitted.

The control apparatus 1B calculates the demanded NH3 slip amount NH3rqr, as mentioned hereinafter, and includes a driver demand NH3 slip amount calculation section 50, an FB target amount calculation section 51, a subtractor 52, a response-specifying controller 53, an onboard identifier 54, a NOx purifying NH3 amount calculation section 55, an adder 56, and a urea injection amount calculation section 57. Specifically, these elements 50 to 57 are implemented by the ECU 2.

In the present embodiment, the ECU 2 corresponds to controlled variable detecting means, first input value calculation means, error calculation means, second input value calculation means, control input calculation means, target value calculation means, and identification means.

First, the driver demand NH3 slip amount calculation section 50 calculates a driver demand NH3 slip amount NH3dsrd by searching a map, not shown, according to the engine speed NE and the demanded torque TRQ. The driver demand NH3 slip amount NH3dsrd is set to such a value at which the amount of ammonia stored in the selective reduction catalyst 12 of the urea SCR system 10 is estimated to be the maximum. This is because the NOx purification rate by the selective reduction catalyst 12 indicates the maximum value when the amount of ammonia stored in the selective reduction catalyst 12 is the maximum, as disclosed in the Japanese Patent No. 5250589 by the present assignee.

In the present embodiment, the driver demand NH3 slip amount calculation section 50 corresponds to the first input value calculation means and the driver demand NH3 slip amount NH3dsrd corresponds to the first input value.

Further, the FB target value calculation section 51 calculates an FB target value NH3cmd by a method similar to the method employed by the above-described FB target pressure calculation section 32. Specifically, the FB target value NH3cmd is calculated by equations formed from the above-mentioned equations (2) to (9) by replacing PB of each parameter by NH3.

That is, the FB target value NH3cmd is calculated by the equations in which PBcmd_bs representative of the reference FB target pressure is replaced by NH3cmd bs representative of a reference FB target value, the PBdsrd representative of the driver demand boost pressure by NH3dsrd representative of the driver demand NH3 slip amount, DPB_ACP representative of the predetermined allowable range value by DNH3_ACP representative of a predetermined allowable range value, PBlmt_acp representative of the allowable upper limit value by NH3lmt_acp representative of the allowable upper limit value, and DPBfb representative of the feedback correction term by DNH3fb representative of the feedback correction term.

In the present embodiment, the FB target value calculation section 51 corresponds to the target value calculation means and the FB target amount NH3cmd corresponds to the target value.

Further, the subtractor 52 (error calculation means) calculates an error e" as a difference (NH3act−NH3cmd) between the NH3 slip amount NH3act and the FB target amount NH3cmd.

On the other hand, the response-specifying controller 53 calculates the feedback correction term DNH3fb with the control algorithm similar to that of the above-mentioned response-specifying controller 34. That is, the feedback correction term DNH3fb is calculated by equations formed from the above-mentioned equations (11) to (14) by replacing e representative of the error by e" representative of the error. In the present embodiment, the response-specifying controller corresponds to the second input value calculation means and the feedback correction term DNH3fb corresponds to the second input value.

Further, the onboard identifier 54 (identification means) calculates a model parameter vector θ" with the identification algorithm similar to that of the above-mentioned onboard identifier 35. Specifically, the model parameter vector θ" is calculated by equations formed from the above-mentioned equations (15) to (23) by replacing e representative of the model parameter vector by θ" representative of the model parameter, e representative of the error by θ" representative of the error, and DPBfb representative of the feedback correction term by DNH3fb representative of the feedback correction term.

Further, the NOx purifying NH3 amount calculation section 55 calculates a NOx purifying NH3 amount NH3nox according to operating parameters such as the engine speed NE and the intake pressure Pin. The NOx purifying NH3 amount NH3nox corresponds to the amount of ammonia required for reducing NOx in exhaust gases discharged from the engine 3 at the present control timing, by the selective reduction catalyst 12.

Then, the adder 56 calculates the demanded NH3 slip amount NH3rqr by adding the feedback correction term DNH3fb and the NOx purifying NH3 amount NH3nox to the driver demand NH3 slip amount NH3dsrd. In the present embodiment, the adder 56 corresponds to the control input calculation means and the demanded NH3 slip amount NH3rqr corresponds to the control input.

Further, the urea injection amount calculation section 57 calculates a urea injection amount Gurea by searching a map, not shown, according to the demanded NH3 slip amount NH3rqr. When the urea injection amount Gurea is thus calculated, a control input signal corresponding thereto is supplied to the urea injection valve 11 of the urea SCR system 10. Then, the NH3 slip amount NH3act is controlled such that it follows up the FB target amount NH3cmd, and when the driver demand NH3 slip amount NH3dsrd is in a steady state, the NH3 slip amount NH3act is controlled such that it becomes equal to the driver demand NH3 slip amount NH3dsrd.

In the present embodiment, the exhaust gas concentration sensor 25 corresponds to the controlled variable detection means and the NH3 slip amount corresponds to the control variable.

With the control apparatus 1B, by the above-described control method, it is possible to obtain the same advantageous effects as provided by the control apparatus 1 according to the first embodiment. That is, differently from the method disclosed in the Publication of Japanese Patent No. 4282572, the equivalent control input Ueq included in the feedback correction term DNH3fb is not a feedforward control term that includes therein the disturbance estimated value c, the controlled variable, and the target value, as variables, but is calculated such that it includes therein the model parameter α, the error e″, and the disturbance estimated value c, as variables. Therefore, it is possible to control the NH3 slip amount NH3act by the demanded NH3 slip amount NH3rqr that is a control input while avoiding mutual interference between the equivalent control input Ueq and the driver demand NH3 slip amount NH3dsrd.

Further, the disturbance-compensating effects of the disturbance estimated value c make it possible to accurately control the NH3 slip amount NH3act that has a response lag characteristic, while suppressing follow-up lag and occurrence of the overshoot. From the above, it is possible to ensure high control accuracy when the NH3 slip amount NH3act that has a response lag characteristic is controlled by combining the feedforward control method, the response-specifying control method, and the disturbance compensation method.

Further, the model parameter α and the disturbance estimated value c are identified onboard, and hence, even when the modeling error in the control target model is increased due to variation in individual products of the controlled object and aging thereof, it is possible to accurately compensate for the modeling error and thereby further improve the control accuracy.

Further, generally, in the selective reduction catalyst 12 that purifies NOx in exhaust gases of the engine 3 in the presence of a reducing agent that is one of urea and ammonia, the NH3 slip amount NH3act, which is an amount of ammonia that passes through the selective reduction catalyst 12, has a significantly large response lag with respect to the demanded NH3 slip amount NH3rqr that is a control input, and this can cause lowering of the NOx purification rate in the selective reduction catalyst 12 and increasing of the amount of ammonia that passes through the selective reduction catalyst, which may cause an increase in odor of exhaust gases. However, with the control apparatus 1B, when such NH3 slip amount NH3act of which the response lag is significantly large is controlled by combining the feedforward control method, the response-specifying control method, and the disturbance compensation method, it is possible to ensure high control accuracy, whereby it is possible to ensure high NOx purification rate in the selective reduction catalyst 12, and suppress the amount of ammonia that passes through the selective reduction catalyst 12, to thereby reduce the odor of exhaust gases. As a result, it is possible to improve marketability.

Although in the third embodiment, the NH3 slip amount NH3act is used as a controlled variable, by way of example, instead of this, the concentration of ammonia that passes through the selective reduction catalyst 12 may be used as a controlled variable.

Further, although in the first to third embodiments described above, the control apparatus according to the present invention is applied to the supercharger 5, the EGR device 8, and the urea SCR system 10 in the engine 3 for automotive vehicles, by way of example, the control apparatus according to the present invention is not limited to this, but may be applied to any other suitable controlled object that has a response lag characteristic. For example, the control apparatus according to the present invention may be applied to a supercharger in the engine for ships, and may be also applied to a plant system such as petroleum plant and water treatment plant, and industrial equipment that has an oil pressure-based drive system or a water pressure-based drive system.

It is further understood by those skilled in the art that the foregoing are preferred embodiment of the invention, and that various changes and modifications may be made without departing from the spirit and scope thereof.

What is claimed is:

1. A control apparatus for controlling a boost pressure changed by a supercharger of an internal combustion engine, by a control input, comprising:

boost pressure detecting means for detecting the boost pressure;

first input value calculation means for calculating a first input value for controlling the boost pressure in a feedforward manner, using a predetermined feedforward control algorithm;

error calculation means for calculating an error using the first input value and the boost pressure;

second input value calculation means for calculating an equivalent control input, which includes a disturbance estimated value and the error as variables, and a reaching law input, using a discrete-time system model equation defining a relationship between the error, a second input value, and the disturbance estimated value, and a predetermined response-specifying control algorithm, and calculating the second input value using a sum of the equivalent control input and the reaching law input;

control input calculation means for calculating the control input as a sum of the first input value and the second input value; and control means for controlling the boost pressure by the calculated control input.

2. The control apparatus according to claim 1, wherein said error calculation means includes target value calculation means for calculating a target value as a value on which a response lag characteristic of the boost pressure with respect to the first input value is reflected, and calculates the error as a difference between the target value and the boost pressure.

3. The control apparatus according to claim 1, further comprising identification means for rewriting the discrete-time system model equation such that a term which is not multiplied by a model parameter of the discrete-time system model equation is placed on a left side of the discrete-time system model equation, and a term which is multiplied by the model parameter and the disturbance estimated value are placed on a right side of the discrete-time system model equation, setting the left side as a virtual controlled variable and the right side as an estimated value of the virtual controlled variable, and identifying onboard the model parameter and the disturbance estimated value such that an error between the virtual controlled variable and the estimated value of the virtual controlled variable is minimized.

4. The control apparatus according to claim 2, further comprising identification means for rewriting the discrete-time system model equation such that a term which is not multiplied by a model parameter of the discrete-time system model equation is placed on a left side of the discrete-time system model equation, and a term which is multiplied by the model parameter and the disturbance estimated value are placed on a right side of the discrete time system model equation, setting the left side as a virtual controlled variable and the right side as an estimated value of the virtual controlled variable, and identifying onboard the model parameter and the disturbance estimated value such that an error between the virtual controlled variable and the estimated value of the virtual controlled variable is minimized.

* * * * *